United States Patent [19]

Mochizuki et al.

[11] Patent Number: 4,722,002
[45] Date of Patent: Jan. 26, 1988

[54] METHOD AND APPARATUS FOR ENCODING/DECODING IMAGE SIGNAL

[75] Inventors: Takashi Mochizuki; Kouichi Shibagaki; Shoji Mizuno, all of Tokyo, Japan

[73] Assignee: NEC Corporation, Tokyo, Japan

[21] Appl. No.: 813,302

[22] Filed: Dec. 24, 1985

[30] Foreign Application Priority Data

| Dec. 25, 1984 | [JP] | Japan | 59-278051 |
| Dec. 26, 1984 | [JP] | Japan | 59-277292 |
| Feb. 14, 1985 | [JP] | Japan | 60-27102 |
| Apr. 24, 1985 | [JP] | Japan | 60-87923 |
| Apr. 24, 1985 | [JP] | Japan | 60-87924 |

[51] Int. Cl.$^4$ ............................................. H04N 7/13
[52] U.S. Cl. ..................... 358/133; 358/138; 375/29
[58] Field of Search ............... 358/133, 135, 136, 138, 358/260; 375/27, 29; 333/166; 328/167; 364/724

[56] References Cited

U.S. PATENT DOCUMENTS

| 4,145,675 | 3/1979 | Picquendar | 328/167 |
| 4,185,325 | 1/1980 | Appel | 333/166 |
| 4,368,487 | 1/1983 | Sabri | 358/133 |
| 4,558,350 | 12/1985 | Murakami | 358/133 |

FOREIGN PATENT DOCUMENTS 2110906 6/1983 United Kingdom .

OTHER PUBLICATIONS

Improved Pulse Search Algorithm for Multi-Pulse Excited Speech Coder.
Motion-Compensated Television Coding: Part 1.
Scene Adaptive Coder.
A new Model of LPC Excitation for Producing Natural-Sounding Speech at Low Bit Rates.

*Primary Examiner*—Howard W. Britton
*Attorney, Agent, or Firm*—Sughrue, Mion, Zinn, Macpeak and Seas

[57] ABSTRACT

The apparatus has encoder and decoder units. The encoder unit is arranged such that a pulse sequence for minimizing the difference between an input image signal and a synthesized signal obtained by supplying the pulse sequence to a transmitting synthesizing filter is calculated and the pulse sequence is encoded and transmitted. The decoder unit is arranged such that the signal received from the encoder unit is decoded, a decoded signal is supplied to a receiving synthesizing filter and the receiving synthesizing filter generates a decoder image signal corresponding to the input image signal.

15 Claims, 52 Drawing Figures

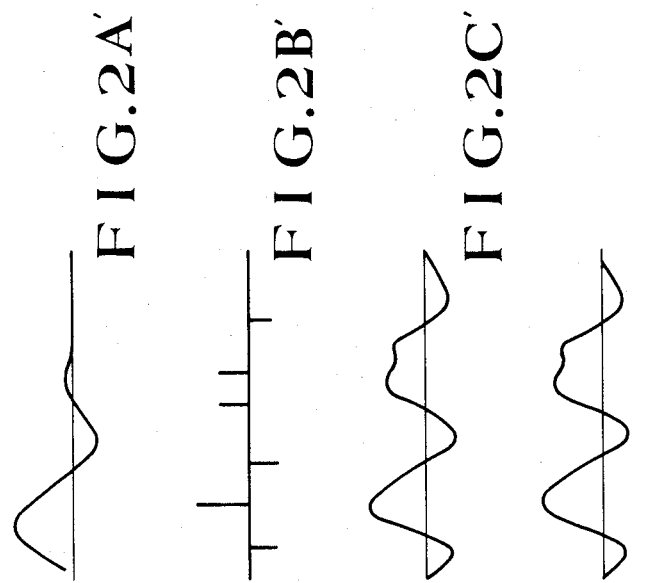
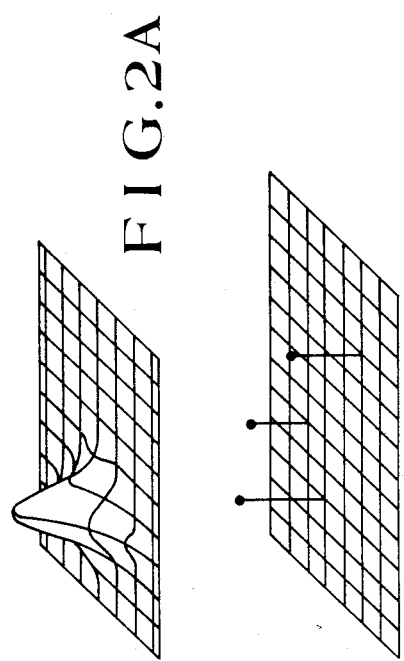
FIG.2A  FIG.2B  FIG.2C  FIG.2D
FIG.2A  FIG.2B  FIG.2C

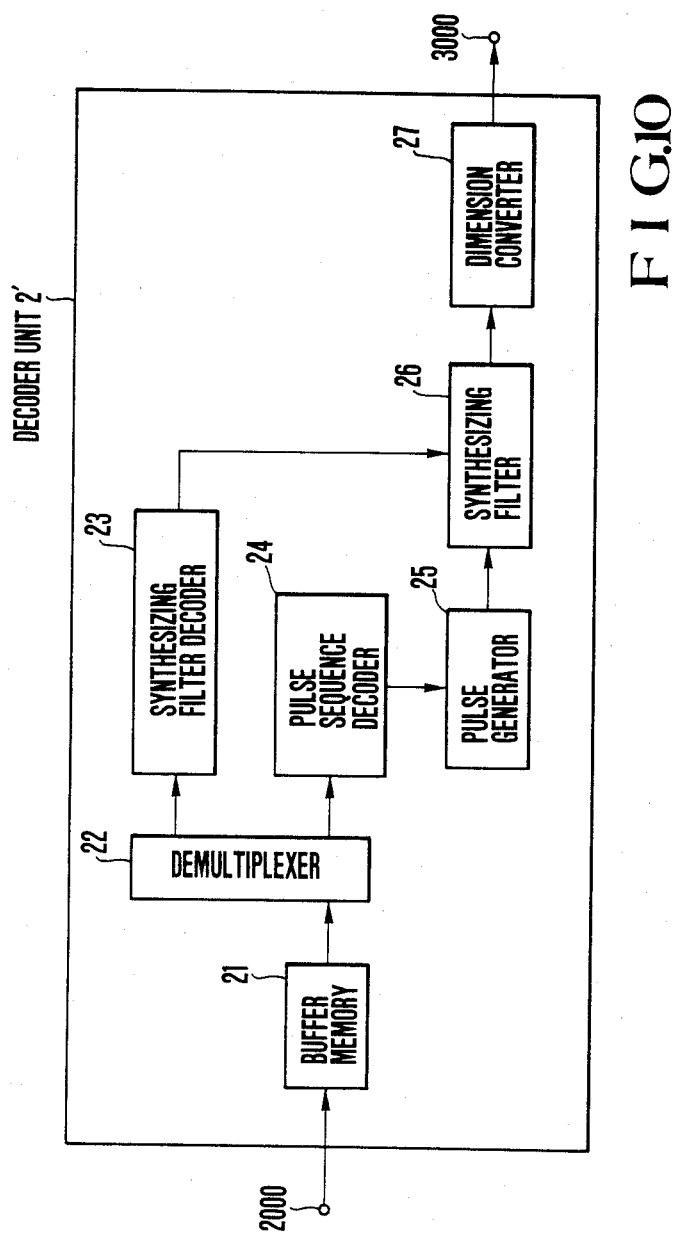
F I G. 10

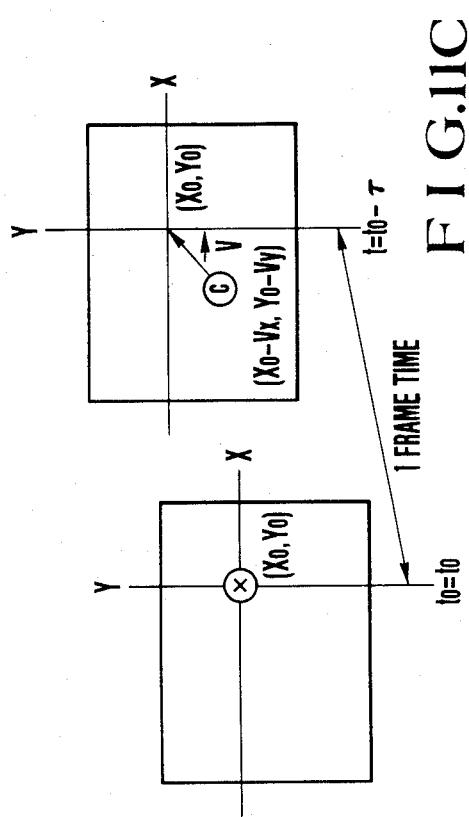
FIG. 11B
FIG. 11C
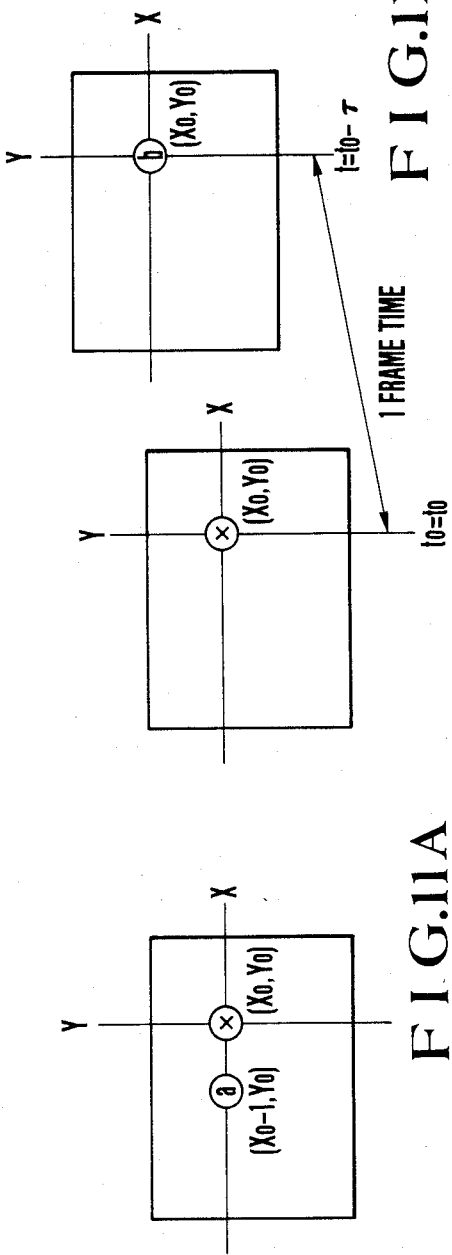
FIG. 11A

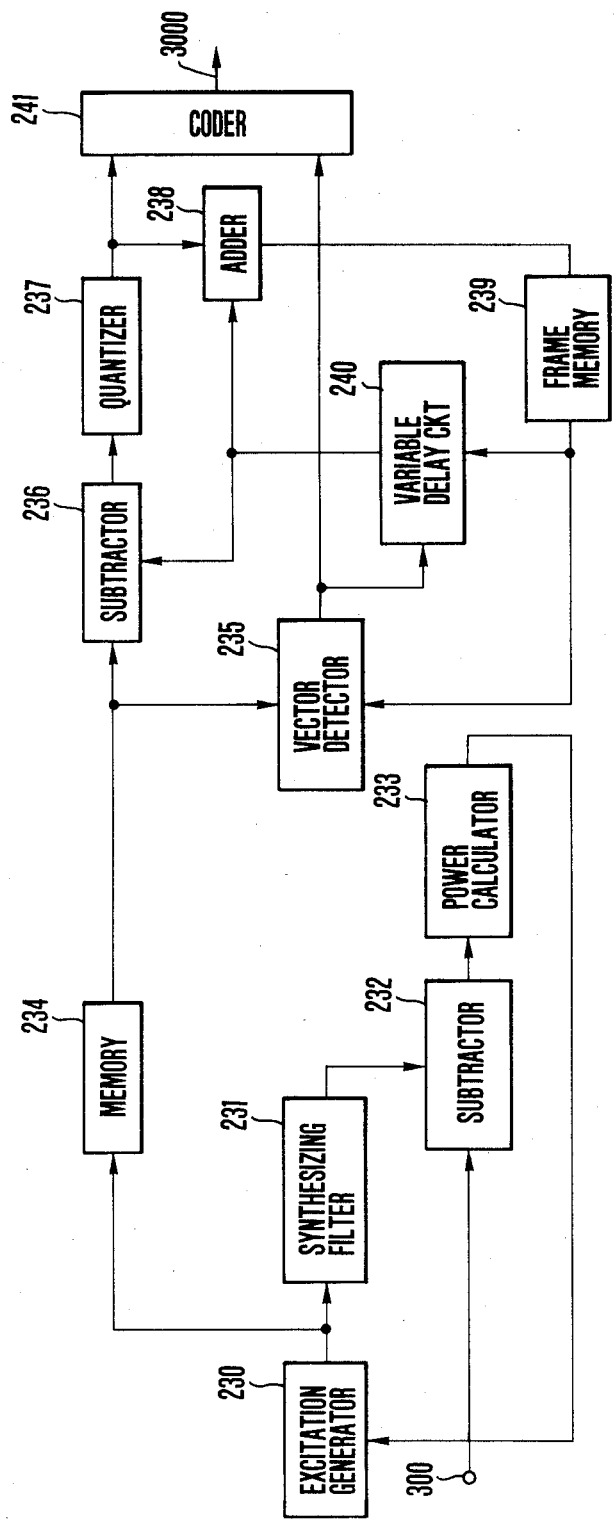
F I G. 21

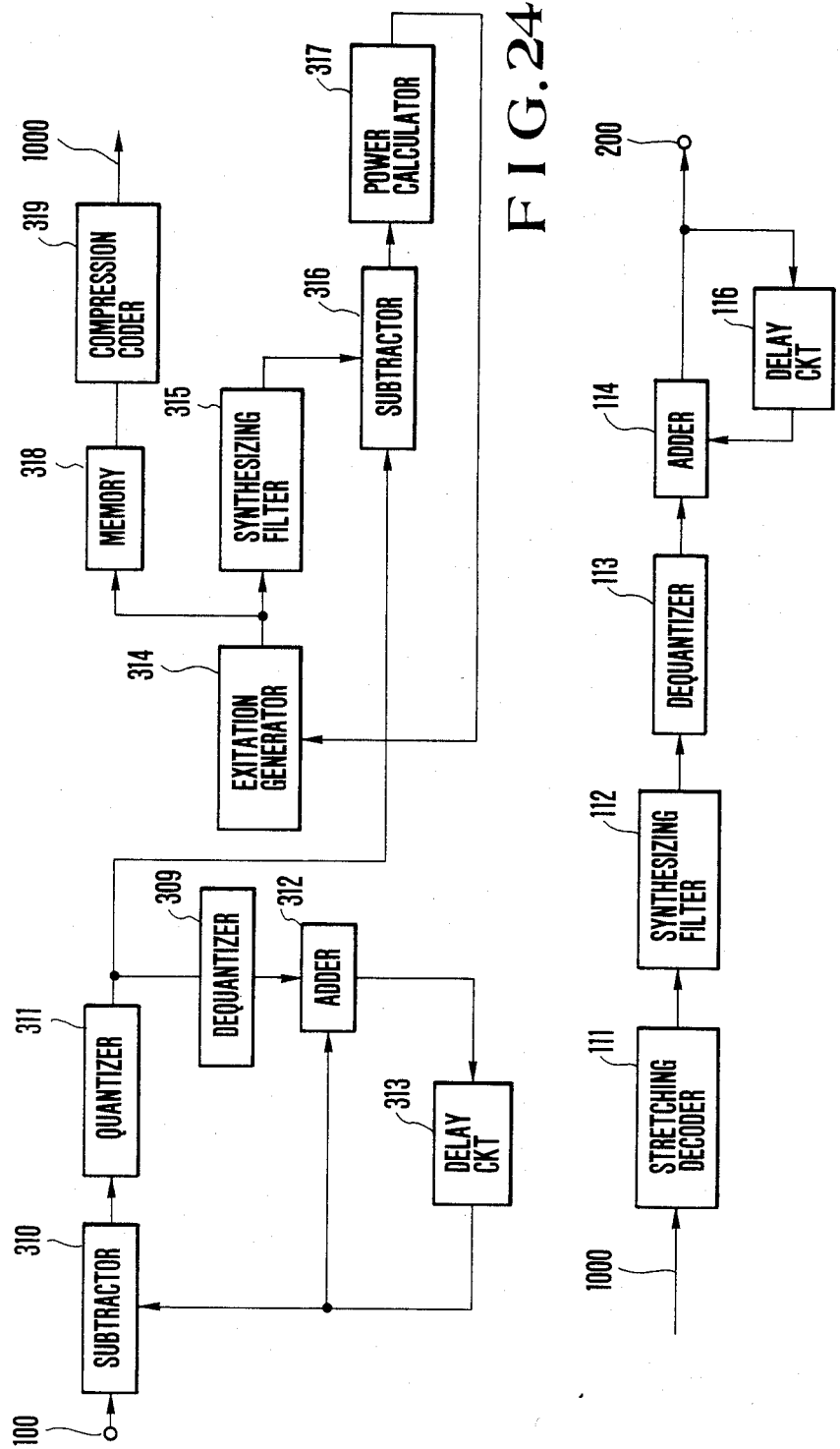

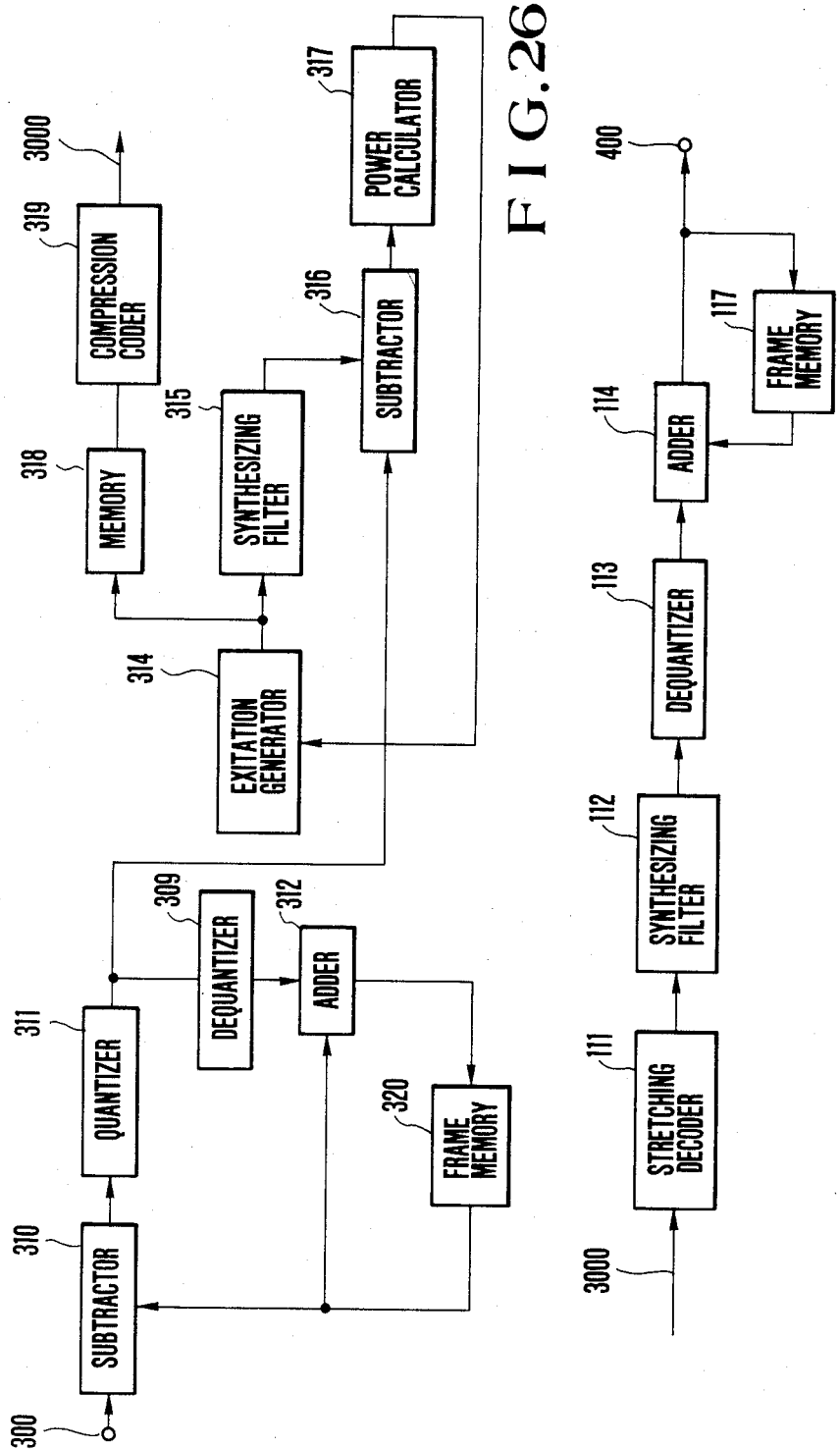

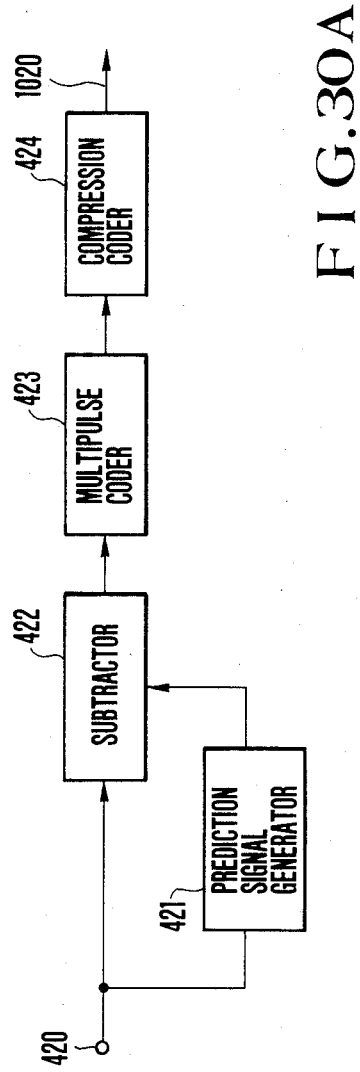
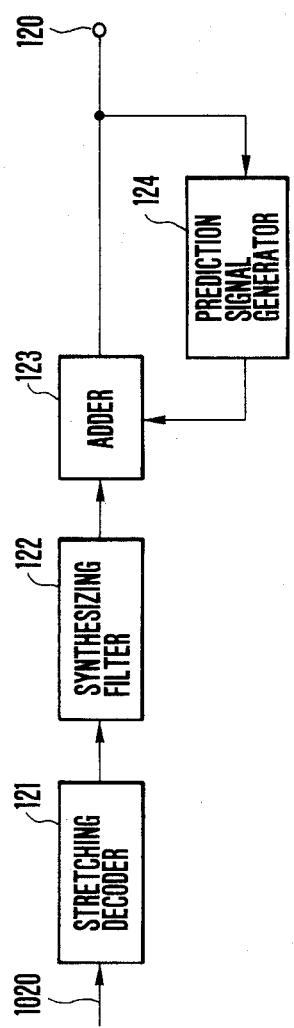
FIG. 30A
FIG. 30B

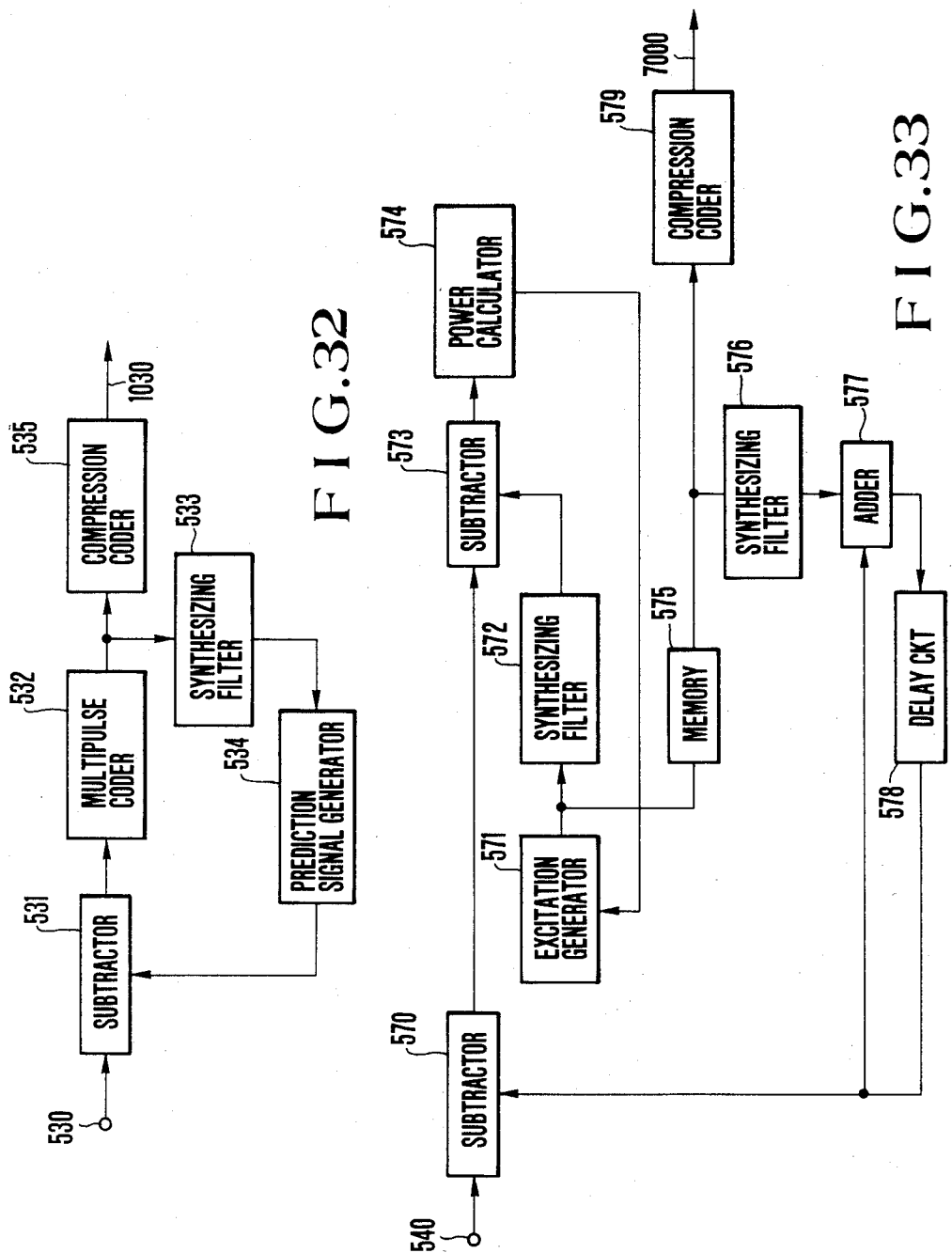

METHOD AND APPARATUS FOR ENCODING/DECODING IMAGE SIGNAL

BACKGROUND OF THE INVENTION

The present invention relates to a method and apparatus for encoding/decoding an image signal with high efficiency.

Conventional image signal encoding/decoding schemes are mainly exemplified by predictive coding and transform coding.

In predictive coding, instead of sending a digitized image signal, a value of a present image signal is predicted by an already coded image signal, and a prediction error signal is sent. Since values of the prediction error signals tend to concentrate near zero, a coded word having a short length is assigned to a quantization level near zero, thereby compressing transmission data. However, in a conventional predictive coding scheme, when a compression ratio of image data is given as 1 bit/pixel, the resolution of a decoded image is rapidly degraded due to quantization noise or the like. It is, therefore, very difficult to compress data at a ratio of 1 bit/pixel or less.

In conversion coding, an image signal is normally divided into blocks each having a proper size, and blocks are expanded in an orthogonal function system, and the expansion coefficients are transmitted. In this case, power tends to concentrate on expansion coefficients corresponding to low-frequency components. In consideration of recognition characteristics, a large number of bits are assigned to a high-power component, while a small number of bits are assigned to a low-power component to achieve coarse quantization, thereby compressing the image signals constituting a one-frame image.

In a conventional transform coding scheme, when the compression ratio is increased, the block structure tends to be apparent, resulting in substantive decrease in the image quality. In order to prevent this, it is preferable to encode a one-frame image without dividing it into blocks. However, the calculation load is then increased to prevent practical implementation. Neither conventional coding scheme can compensate for abrupt changes in image signal levels.

SUMMARY OF THE INVENTION

It is a principal object of the present invention to provide a method and apparatus for compensating for abrupt changes in image signal level which cannot be compensated by the conventional encoding/decoding schemes, and encoding/decoding an image signal so as to reproduce an image with high quality in low-bit rate transmission which is subject to great degradation of image quality in the conventional schemes.

It is another object of the present invention to provide a method and apparatus for performing predictive coding for greatly decreasing the number of image data while image quality degradation can be minimized as compared with a conventional image signal predictive coding scheme.

It is still another object of the present invention to provide an encoding apparatus suitable for the above predictive coding system.

It is still another object of the present invention to provide a decoding apparatus suitable for the above predictive coding system.

According to an aspect of the present invention, there is provided a method of encoding/decoding an image signal, wherein a pulse sequence for minimizing a difference between an input image signal and a synthesized signal obtained by supplying the pulse sequence to a synthesizing filter is obtained, a resultant pulse sequence is coded, and the coded pulse sequence is transmitted at a transmission side; and the coded pulse sequence is decoded, the decoded pulse sequence is supplied to a synthesizing filter to obtain a synthesized signal, and the synthesized signal is generated as a decoded image signal corresponding to the input image signal at a reception side.

According to another aspect of the present invention, there is provided an apparatus for encoding/decoding an image signal, comprising means for calculating a pulse sequence for minimizing a difference between an input image signal and a synthesized signal obtained by supplying the pulse sequence to a synthesizing filter and means for encoding the resultant pulse sequence at a transmission side; and means for receiving and decoding the coded pulse sequence, and means for supplying a decoded pulse sequence to a synthesizing filter to obtain a synthesized signal and generating the synthesized signal as a decoded image signal corresponding to the input image signal at a reception side.

BRIEF DESCRIPTION OF THE DRAWINGS

FIGS. 2A to 2C show waveforms for explaining the embodiment in FIG. 1A;

FIGS. 2A' to 2D' show waveforms for explaining the embodiment in FIG. 1B;

FIG. 10 is a block diagram of an image signal decoding apparatus according to still another embodiment of the present invention;

FIGS. 11A to 11C are representations for explaining different image signal predictive coding schemes, respectively;

FIGS. 21 and 22 are respectively block diagrams of encoder and decoder units corresponding to the method in FIGS. 18, 19 and 20;

FIGS. 24 and 25 are respectively block diagrams of encoder and decoder units which exemplify the embodiments of FIGS. 23A and 23B in accordance with an intraframe predictive scheme;

FIGS. 26 and 27 are respectively block diagrams of encoder and decoder units which exemplify the embodiments of FIGS. 23A and 23B in accordance with an interframe predictive scheme;

FIGS. 30A and 30B are respectively block diagrams showing modifications of the embodiments in FIGS. 23A and 23B;

FIG. 32 is a block diagram showing an arrangement of an encoder unit according to still another embodiment of the present invention; and FIG. 33 is a block diagram of an encoder which exemplifies the embodiment of FIG. 32 in accordance with an intraframe predictive scheme.

DETAILED DESCRIPTION OF THE PREFERRED EMBOODIMENTS

Preferred embodiments of the present invention will be described in detail with reference to the accompanying drawings.

Figure 1A:
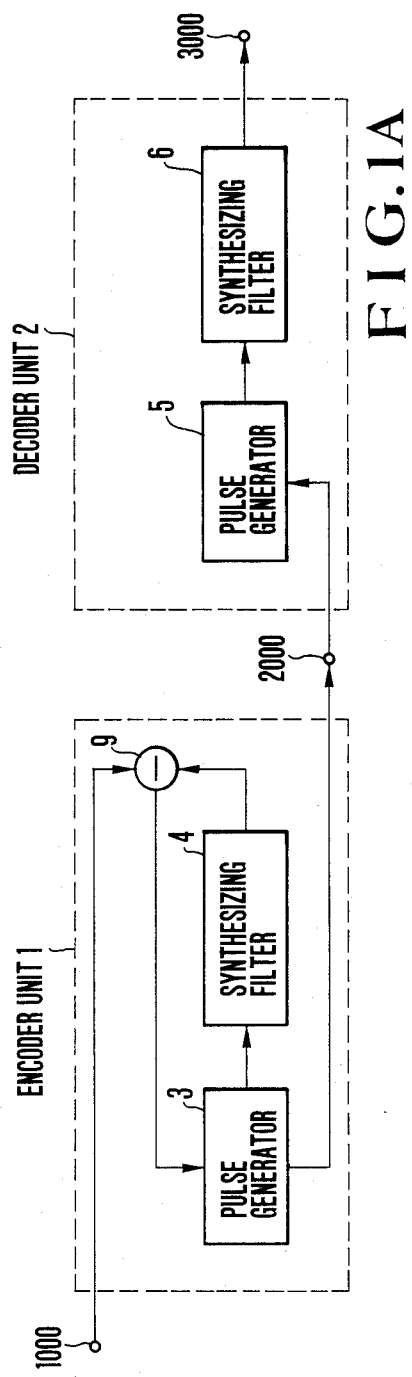
FIGS. 1A and 1B are block diagrams showing methods and apparatuses for encoding/decoding an image signal according to embodiments of the present invention, respectively.

FIG. 1A shows a method and apparatus for encoding/decoding an image signal according to an embodiment of the present invention. An input image signal supplied to a terminal 1000 is encoded by an encoder unit 1. A coded image signal is supplied to a decoder unit 2 through a transmission line 2000. The decoder unit 2 decodes the coded image signal, and the decoded signal is supplied to an output terminal 3000.

In the encoder unit 1 shown in FIG. 1A, a pulse sequence is generated by a pulse generator 3 and is supplied to a synthesizing filter 4 which has an impulse response characteristic shown in FIG. 2A. A waveform shown in FIG. 2C is derived as an output by the synthesizing filter 4. The impulse response represents a basic waveform, and the pulse sequence serves as data representing an impulse response position and its amplitude. In other words, the waveform can be approximated using the pulse sequence and the impulse response. A technique for determining the impulse response and the pulse sequence is described by B.S. Atal et al., "A New Model of LPC Extraction for Producing Natural-Sounding Speech at Low Bit Rates", Proceedings of 1982 IEEE International Conference on Acoustics, Speech & Signal Processing. According to this technique, the waveform of a speech signal is approximated by using a pulse sequence and an impulse response of a synthesizing filter. The pulse sequence and the impulse response are encoded and transmitted, thereby compressing the data.

Although an image signal can be converted to a one-dimensional time-serial signal such as an audio signal and then encoded by the Atal's scheme, its conversion efficiency is low. More specifically, assume that horizontal scanning is repeated for a two-dimensional image for conversion into a one-dimensional signal, and the one-dimensional signal is coded by the Atal's scheme. In this case, the Atal's scheme allows to establish horizontal correlation of the image signal but cannot establish vertical correlation. In general, vertical and horizontal correlations are equally important for the image signal. When only one of the correlations is used, coding efficiency is degraded. However, in the embodiment representing a method of encoding/decoding an image signal in FIG. 1, a two-dimensional synthesizing filter and a two-dimensional pulse search allows utilization of the two-dimensional correlation of the image signal, thereby achieving encoding with high efficiency. Referring to FIG. 1A, one pulse is generated by the pulse generator 3 and is supplied to the synthesizing filter 4. The position along horizontal and vertical directions and the amplitude of the pulse are changed such that power of an error signal representing the difference between the input image signal and a synthesized signal from the synthesizing filter 4 is minimized. In this manner, one pulse is determined. Then, the second pulse, third pulse . . . are sequentially determined, while the position and amplitude of the first pulse are fixed. According to this scheme, a large number of calculations must be performed for pulse search. A technique for searching a pulse by a small number of calculations is described by Ono et al., "Improved pulse search algorism for multipulse excited speech coder", PROC. GLOBCOM Nov. 1984, page 278-291. The technique used for the speech signal is expanded for a two-dimensional application. The synthesizing filter 4 may have optimal characteristics corresponding to those of the input image signal in the same way as in Atal's scheme or may have permanent characteristics.

A case will be described in FIGS. 3A, 3B and 3C wherein the impulse response is permanent. If an input pulse sequence at the N1xN2 point, an output signal and an impulse response at the (2N1-1)x(2N2-1) point are respectively given as x(n1,n2), y(n1,n2) (for $0 \leq n1 \leq N1-1$, $0 \leq n2 \leq N2-1$) and h(m1,m2) (for $-N1+1 \leq m1 \leq N1-1$, $-N2+1 \leq m2 \leq N2-1$), that is, if the following equation is established:

$$y(n1, n2) = \sum_{l1=0}^{N1-1} \sum_{l2=0}^{N2-1} h(n1 - l1, n2 - l2) X(l1, l2)$$

a ¼ plane unit (exponential) step is given as follows:

$$h(m1, m2) = \begin{cases} a^{-m1, -m2} & (0 \leq m1 \leq N1 - 1, \\ & 0 \leq m2 \leq N2 - 1) \\ 0 & (\text{elsewhere}) \end{cases} \quad (1)$$

for $0 < a \leq 1$

Figure 3A:
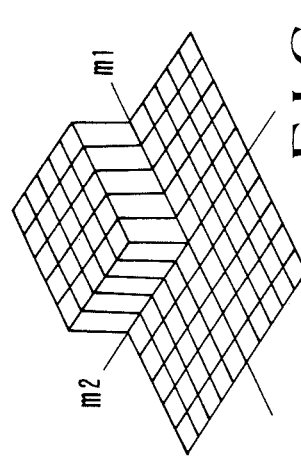
FIGS. 3A to 3C are diagrams for explaining the embodiment in FIG. 1A.
Figure 3B:
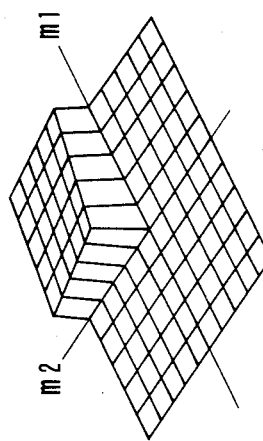

FIGS. 3A and 3B show cases for a =1 and a <1 in equation (1).

Figure 3C:
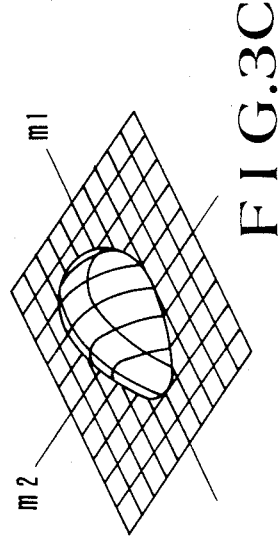

FIG. 3C shows a semi-ellipsoidal function given by equation (2):

$$h(m1, m2) = \begin{cases} \sqrt{1 - (m1/M1)^2 - (m2/M2)^2} \\ \qquad ((m1/M1)^2 - (m2/M2)^2 \leq 1) \\ 0 \qquad \text{(elsewhere)} \end{cases} \quad (2)$$

Furthermore, the characteristics of the synthesizing filters of the encoder and decoder units need not match.

Figure 1B:
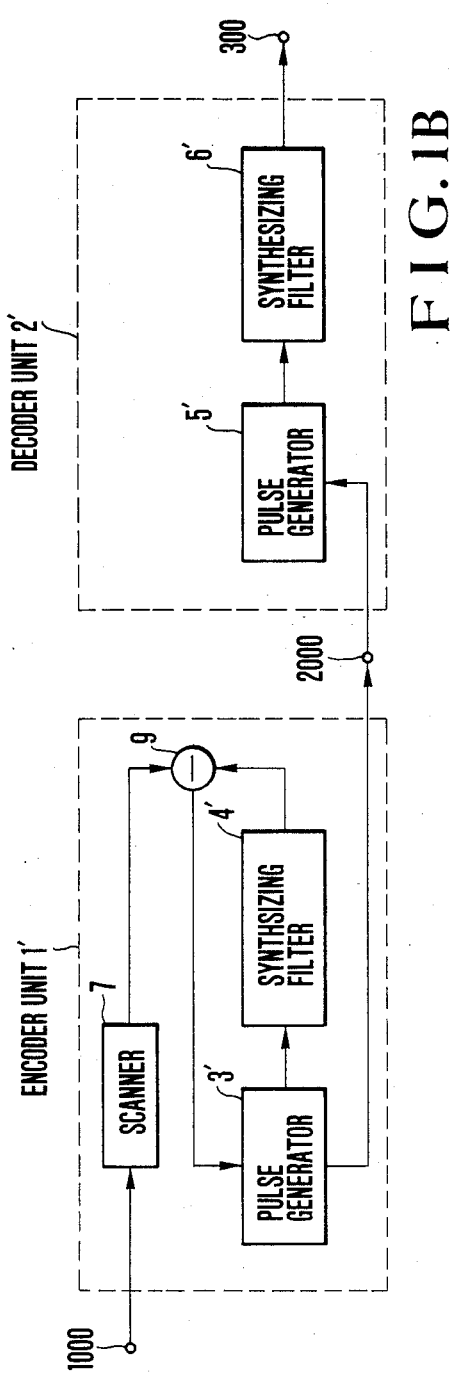
Figure 4A:
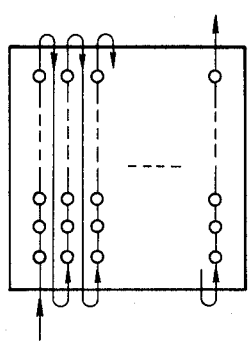
FIGS. 4A to 4D are diagrams for explaining scanning procedures.
Figure 4B:
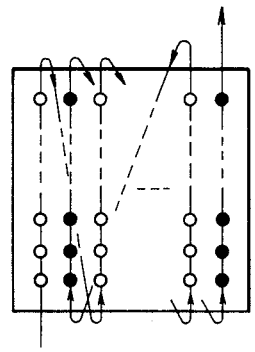
Figure 4C:
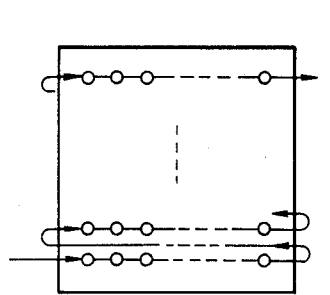
Figure 4D:
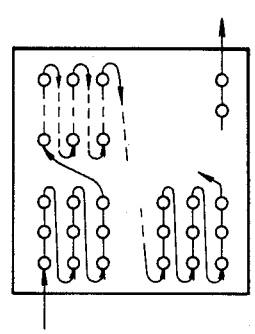

When the image signal is converted to a one-dimensional time-serial signal such as an audio signal, the image signal can be coded by the Atal's scheme. For this purpose, horizontal scanning can be repeated, which is exemplified in FIG. 1B. Various scanning techniques can be utilized: FIG. 4A shows noninterlaced scanning, FIG. 4B shows interlaced scanning, FIG. 4C shows vertical scanning, and FIG. 4D shows intrablock/interblock horizontal scanning. Synthesizing filters 4' and 6' in FIG. 1B are one-dimensional synthesizing filters, respectively. The operation of the synthesizing filters 4' and 6' can be readily explained using the impulse response characteristics of the synthesizing filter 4', in FIG. 2A', the pulse sequence in FIG. 2B', the response signal in FIG. 2C' and the input image signal in FIG. 2D', and a detailed description thereof is omitted. In the case shown in FIG. 1B, the characteristics of the synthesizing filters 4' and 6' may be calculated as optimal characteristics in accordance with the input image signal like in the Atal's scheme, or may be predetermined as permanent characteristics. Furthermore, the characteristics of the synthesizing filters 4' and 6' of an encoder unit 1' and a decoder unit 2' need not match. When a processed decoded image is to be obtained, a desired processing function is added to the characteristics of the synthesizing filter in the decoder unit.

In the embodiments in FIGS. 1A and 1B, the pulse waveform is based on an impulse. However, the impulse need not be used. A discrete signal with a predetermined width, e.g., a rectangular, triangular or Gaussian wave may be used.

Coding distortions can be reduced against abrupt changes in image signal level when the pulse amplitude and position are properly determined. As compared with the conventional encoding/decoding scheme, the method of this embodiment can properly compensate for the abrupt changes in image signal level. The method of this embodiment is to encode the position and amplitude of discrete pulses in the pulse sequence. Therefore, the amount of information to be coded is small, thereby greatly decreasing the bit rate as compared with that of the conventional scheme.

An apparatus for encoding/decoding an image signal according to another embodiment of the present invention will be described.

Figure 5:
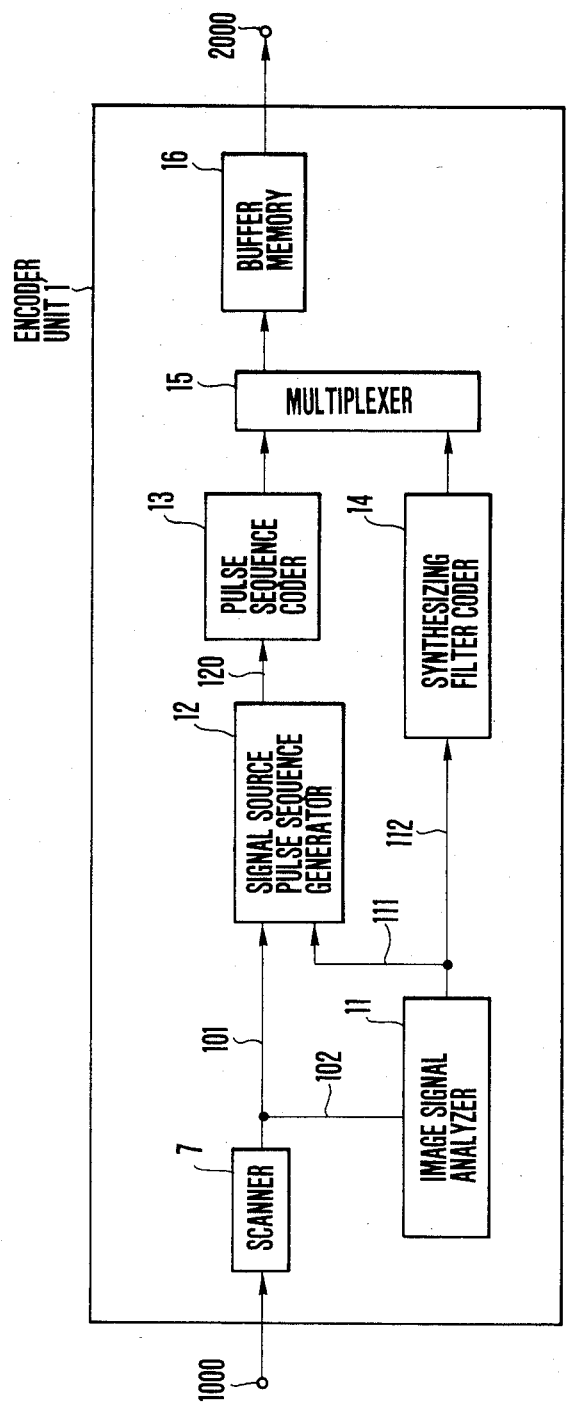
FIG. 5 is a block diagram showing an image signal encoding apparatus according to still another embodiment of the present invention.
Figure 6A:
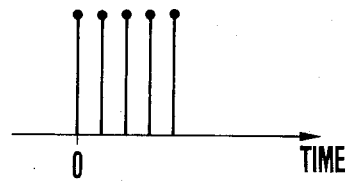
FIGS. 6A to 6D are graphs for explaining the embodiment shown in FIG. 5.
Figure 6B:
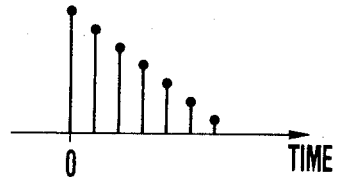
Figure 6C:
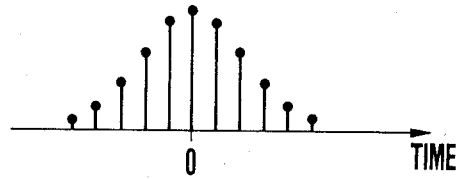
Figure 6D:
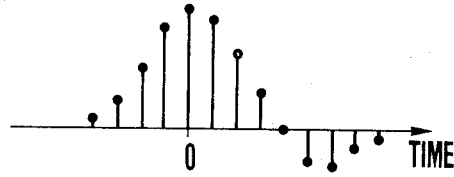

FIG. 5 shows an encoder unit 1' including the scanner 7 for converting a two-dimensional image signal to a one-dimensional signal in accordance with scanning.

Referring to FIG. 5, a two-dimensional input image supplied to an input terminal 1000 is converted by a scanner 7 to a one-dimensional time-serial signal. The one-dimensional time-serial signal is supplied to an image signal analyzer 11 and a signal source pulse sequence generator 12 respectively through lines 102 and 101. One of the scanning techniques in FIGS. 4A to 4D can be used in the scanner 7. The image signal analyzer 11 calculates an optimal impulse which is derived from the image signal converted as the time-serial signal and which is suitable for the impulse response of the synthesizing filter, and determines a parameter of the synthesizing filter. The synthesizing filter parameter is supplied to the signal source pulse sequence generator 12 and a synthesizing filter coder 14 respectively through lines 111 and 112. The synthesizing filter coder 14 encodes the synthesizing filter parameter, and the encoded parameter is supplied to a multiplexer 15. The signal source pulse sequence generator 12 supplies the pulse sequence to the synthesizing filter determined by the image signal analyzer 11 and calculates a signal source pulse sequence such that the resultant synthesized signal is sufficiently similar to the image signal converted to the time-serial signal. The signal source pulse sequence is supplied to a pulse sequence coder 13 through a line 120. The pulse sequence coder 13 encodes the pulse sequence, and the encoded pulse sequence is supplied to the multiplexer 15. The multiplexer 15 reorders the coded pulse sequence and the synthesizing filter parameter in a predetermined sequence and supplies the reordered signal as an encoded signal to a buffer memory 16. The buffer memory 16 performs bit rate matching with a transmission line 2000 and sends the coded image signal onto the transmission line 2000. When the permanent impulse response characteristic is adapted for the synthesizing filter, the image signal analyzer 11, the synthesizing filter coder 14 and the multiplexer 15 can be omitted. An output from the pulse sequence coder 13 is directly suppl.ied to the buffer memory 16. The permanent impulse response characteristic is exemplified by rectangular and Gaussian waveforms shown in FIGS. 6A, 6B, 6C and 6D but is not limited to these waveforms. Any permanent impulse response characteristic can be used if it matches the characteristics of the image signal with a normal waveform.

Figure 7:
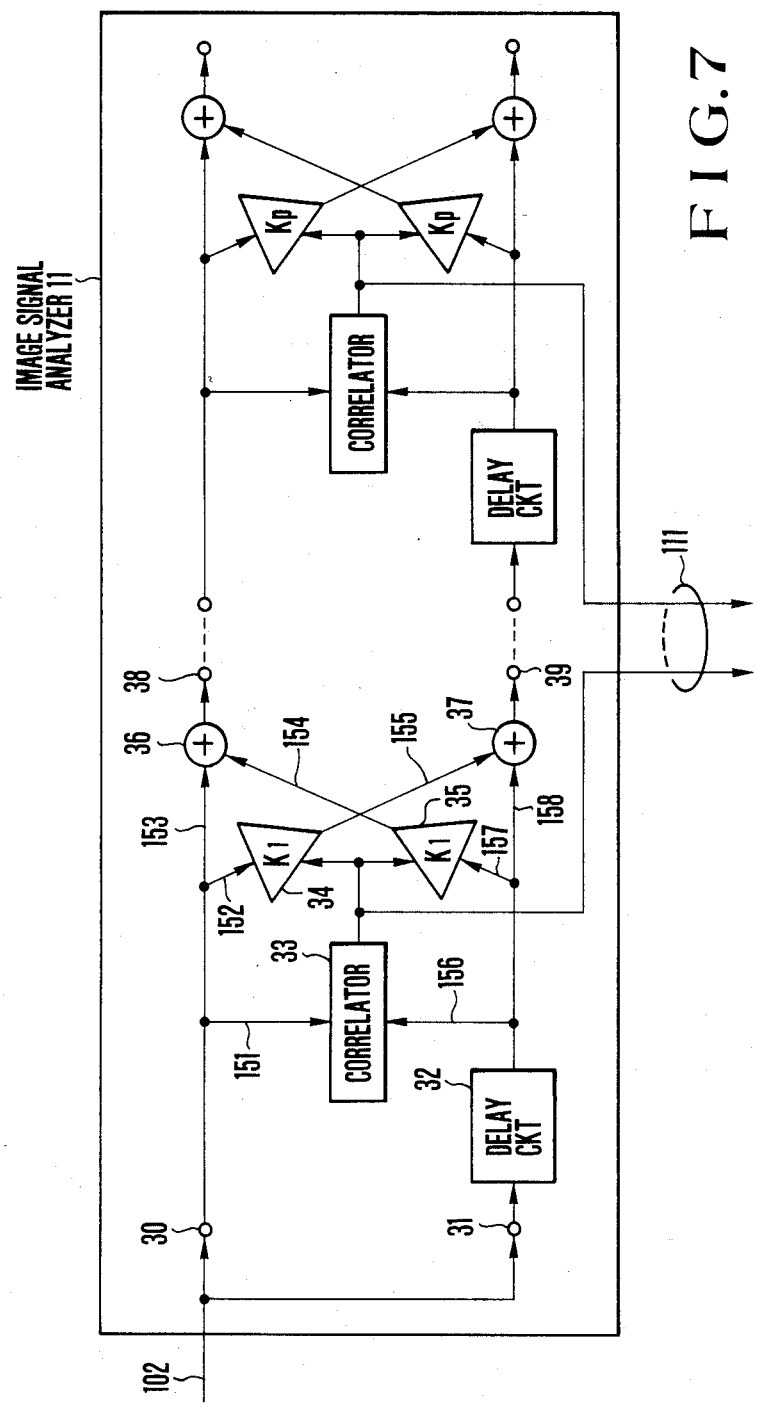
FIGS. 7, 8 and 9 are block diagrams showing detailed arrangements of the embodiment shown in FIG. 5.

The image signal analyzer 11 will be described when the input image signal is analyzed and a synthesizing filter impulse response corresponding to the input image signal is set. A technique for obtaining a synthesizing filter parameter is exemplified by linear predictive coding (LPC) together with partial correlation (PARCOR) analysis. FIG. 7 is a block diagram of an image signal analyzer adapting PARCOR analysis. The image signal analyzer 11 has a proper number of stages p connected in series with each other. Each stage comprises 2-input 2-output block which has a delay circuit of one sampling time, one correlator, two variable amplifiers and two adders. Each stage receives two output signals of the immediately preceding stage as two input signals thereof. In the first stage, the image signal converted to the time-serial signal is supplied to two input terminals 30 and 31 through a line 102. The operation of each stage is exemplified by that of the first stage. The input signal (i.e, the first input signal) supplied to the terminal 30 is supplied to a correlator 33, a variable amplifier 34 and an adder 36 respectively through lines 151, 152 and 153. An input signal (i.e., the second input signal) supplied to the terminal 31 is supplied to a delay circuit 32 and is delayed by a one-sampling time. The delayed signal is supplied to the correlator 33, the variable amplifier 35 and an adder 37 respectively through lines 156, 157 and 158. The correlator 33 calculates a correlation between the two signals supplied from the lines 151 and 156 and supplies a correlation coefficient (PARCOR coefficient) k1 (the ith coefficient is represented by ki) as a gain factor of the variable amplifiers 34 and 35. The PARCOR coefficient k1 is also generated as the synthesizing filter parameter through a line (group) 111. The variable amplifier 35 multiplies with k1 the signal supplied through the line 157 in accordance with the PARCOR coefficient k1 (ki for the ith stage). The amplified output is supplied to the adder 36 through a line 154. The adder 36 adds the two signals supplied through the lines 153 and 154, and an output from the adder 36 appears as the current output (the first output in this case) of the current stage (the first stage in this case) at an output terminal 38. The variable amplifier 34 multiplies with k1 the signal supplied through the line 152 in accordance with the PARCOR coefficient k1 (ki for the ith stage). The amplified signal is supplied to the adder 37 through a line 155. The adder 37 adds the two signals supplied through the lines 155 and 158. The current output (the second output) of the current stage (the first stage) appears at an output terminal 39. The first and second output signals are respectively supplied as the first and second input signals for the second and subsequent stages.

In the above description, for the sake of simplicity, a lattice filter for receiving the one-dimensional signal and generating the one-dimensional signal is exemplified. However, the filter can be a filter for receiving multi-dimensional inputs and generating multi-dimensional outputs. A detailed description of such a filter is made by B. Friedlandaer, "Lattice Filters for Adaptive Processing", Proceedings of the IEEE, Vol. 70. No. 8, August, 1982. In this case, the image signal analyzer 11 receives the two-dimensional image signal and can analyze a signal component corresponding to the two-dimensional PARCOR coefficient. Another interpretation of the image signal analyzer 11 may be as follows. The image signal analyzer 11 receives each image signal on a plurality of scanning lines and analyzes each component for the PARCOR coefficient which appears on the corresponding scanning line and components for the PARCOR coefficients between the scanning lines. When the image signals of the m scanning lines are received in a parallel manner, one-dimensional PARCOR coefficients ki ($1<i<p$) are obtained in an expanded form of an $m\times m$ matrix. The PARCOR coefficients expanded in the $m\times m$ matrix can sufficiently express the two-dimensional correlations of the image signals on the m scanning lines. This cannot be achieved by the one-dimensional PARCOR coefficients given by the Atal's scheme. A lattice filter for receiving one-dimensional signals does not degrade the filter characteristics even if a high-order PARCOR coefficient ki is coarsely quantized as compared with the case of coefficients k1 and k2, thereby decreasing the number of bits. This effect can be expected when the lattice filter is a multi-dimensional filter. The PARCOR coefficient of the $m\times m$ dimensions can be compressed in accordance with vector coding.

The signal source pulse sequence generator 12 will be described in detail.

Figure 8:
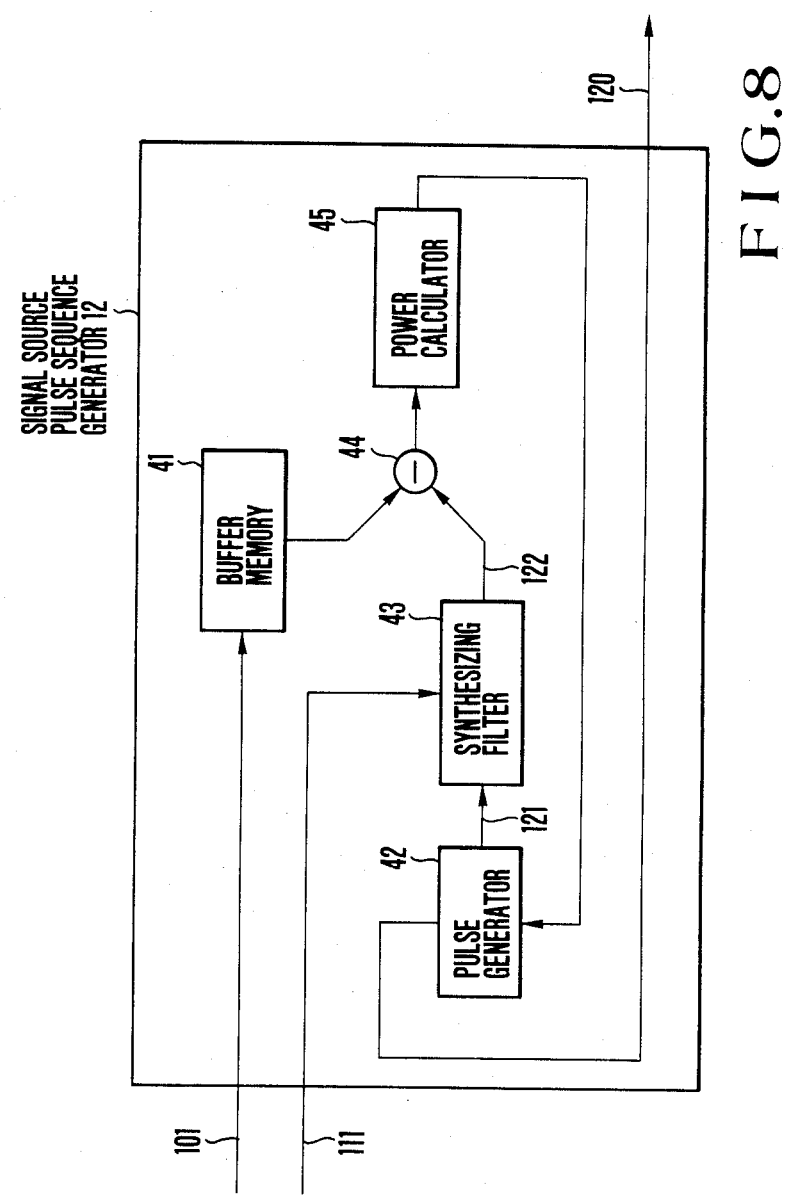
Figure 9:
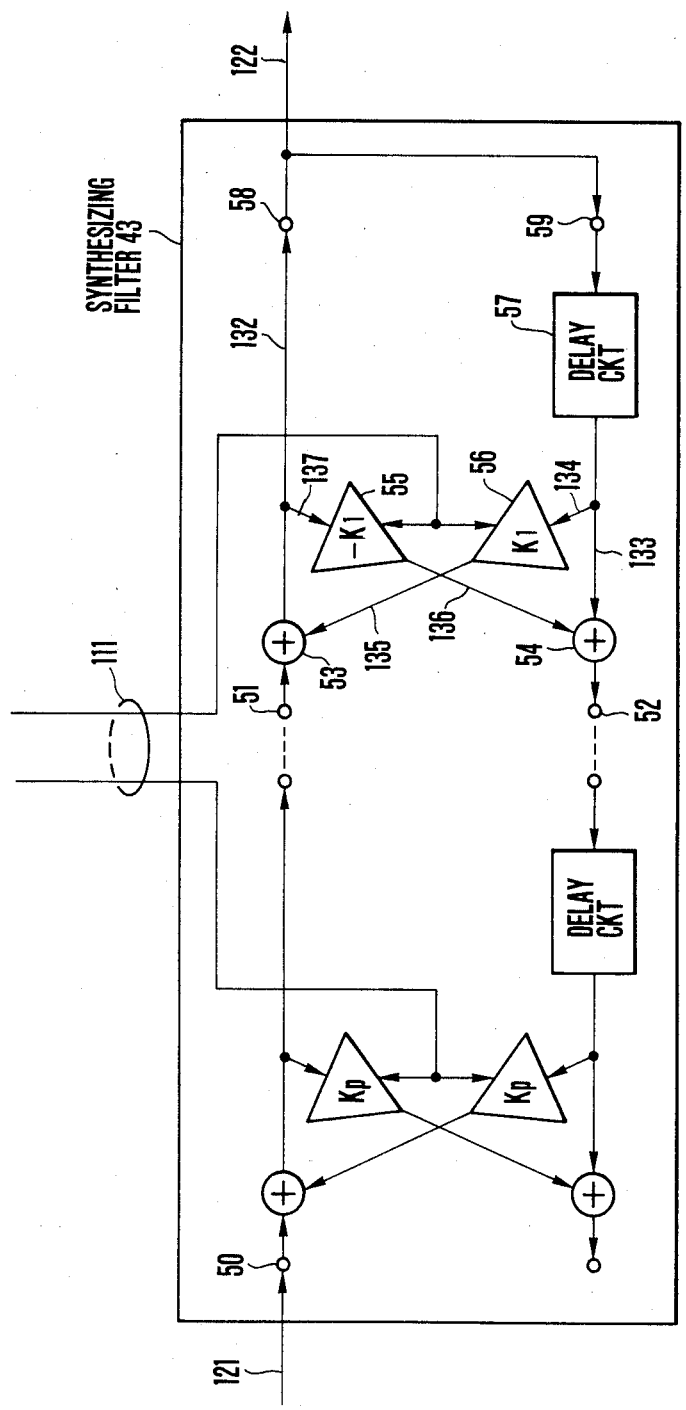

FIG. 8 shows an arrangement of the signal source pulse sequence generator 12. A pulse generator 42 supplies one pulse to a synthesizing filter 43, and a synthesized signal from the synthesizing filter 43 is supplied to a subtractor 44 through a line 122. When the impulse response of the synthesizing filter 43 is variable, the synthesizing filter 43 is constituted by using a parameter signal supplied from the image signal analyzer 11 through a line 111, as shown in FIG. 9. A detailed arrangement of such a synthesizing filter will be described later. When a synthesizing filter with a permanent impulse response is used, the line 111 is omitted.

An image signal converted to the time-serial signal is supplied to a buffer memory 41 through the line 101 and then to the subtractor 44. The subtractor 44 calculates an error signal representing the difference between the outputs from the buffer memory 41 and the synthesizing filter 43. A power calculator 45 calculates the power of the error signal. The pulse generator 42 changes the pulse position and its amplitude, calculates error power in each change state, and searches the change state representing a minimum error power. In this manner, one optimal pulse is determined. When the first pulse is determined, it is left unchanged and the following pulses are searched. Therefore, a signal similar to the image signal converted to the time-serial signal can be synthesized. The obtained pulse sequence is generated through a line 120.

In the above description, lower powers of the error signals are searched as a reference for obtaining a pulse sequence. However, this reference can be given as an absolute value sum of the error signals or smaller ones of the maximum values of the absolute values of the error signals. Any other reference can be selected as needed.

A lattice filter is exemplified when its impulse response is variable. When the impulse variable type lattice filter in FIG. 9 constitutes the synthesizing filter 43, the PARCOR efficients obtained by the image signal analyzer 11 can be used without modifications.

The synthesizing filter 43 has p 2-input 2-output series-connected blocks in the same manner as in the analyzer 11. Each block has one delay circuit of one sampling time, two variable amplifiers and two adders. Each stage receives two outputs respectively from the immediately preceding and following stages. A pulse sequence is supplied to a terminal 50 of the first stage through a line 121. A signal from a terminal 58 of the last stage is supplied to a terminal 59 thereof. A synthesized signal appears from the terminal 58 of the last stage through the line 122.

The operation of the last stage (i.e., the pth stage) represents that of each stage and is exemplified hereinafter.

A signal (i.e., the second input signal) supplied from the immediately following stage (the terminal 58 in this case) to the terminal 59 is delayed by a delay circuit 57 by one sampling time. The delayed signal is supplied to an adder 54 and a variable amplifier 56 respectively through lines 133 and 134. The adder 54 adds the two signals respectively supplied through lines 133 and 136, and a sum signal appears at a terminal 52. The signal appearing at the terminal 52 is supplied as the second output signal to the immediately preceding stage. The variable amplifier 56 multiplies with k1 the signal supplied through a line 134 in accordance with the PARCOR coefficient k1 (kp−i for the ith stage).

The technique described by B. Friedlandaer can be applied to the lattice filter 43 of one-dimensional type in the same manner as in the lattice filter as the image signal analyzer 11, thereby providing a lattice filter for processing a multi-dimensional signal. In this case, m parallel pulses are received by the lattice filter, and parallel image signals for the m scanning lines are generated. The expanded PARCOR coefficient ki ($1\leq i\leq p$) is supplied as an $m\times m$ matrix signal to the synthesizing filter.

The signal (i.e., the first input signal) supplied from the immediately preceding stage to a terminal 51 is supplied to an adder 53 and added to the signal supplied through a line 135. A sum signal from the adder 53 is supplied to a variable amplifier 55 and the terminal 58 respectively through lines 137 and 132. The signal supplied to the terminal 58 is supplied as the first output signal to the next stage (the line 122 in this case). The variable amplifier 55 multiplies with −k1 the signal supplied through the line 137 in accordance with the PARCOR coefficient k1 (kp−i for the ith stage) supplied from the synthesizing filter analyzer 11 through the line (group) 11. A signal from the variable amplifier 55 is supplied to the adder 54 through a line 136.

FIG. 10 shows an embodiment of the decoder unit of FIG. 1B. Referring to FIG. 10, a coded image signal supplied from a transmission path is supplied to a demultiplexer 22 after bit rate matching between the transmission line and the decoder unit is established by a buffer memory 21. The demultiplexer 22 separates the coded synthesizing filter data from the signal source pulse sequence data which are respectively supplied to a synthesizing filter decoder 23 and a pulse sequence decoder 24. The pulse sequence decoder 24 decodes the coded signal source pulse sequence data, and the decoded data is supplied to a pulse generator 25. The synthesizing filter decoder 23 decodes the coded synthesizing filter data, and the decoded data is supplied to a synthesizing filter 26. When the synthesizing filter 26 adapts a permanent impulse response, the demultiplexer 22 and the synthesizing filter decoder 23 can be omitted. The output signal from the buffer memory 21 is directly supplied to the pulse sequence decoder 24. The pulse generator 25 generates a pulse sequence in accordance with the decoded signal source pulse sequence data, and the pulse sequence is supplied to the synthesizing filter 26. The pulse sequence supplied to the synthesizing filter 26 is converted to a one-dimensional synthesized signal and appears as a decoded image signal at the terminal 3000 through a dimension converter 27 for performing bit rate matching with the terminal 3000. The impulse response of the synthesizing filter 26 may be permanent or variable. Even if the permanent impulse response is adapted, it need not match with that of the synthesizing filter 43 in the encoder unit. When the synthesizing filter has a variable impulse response, the same arrangement as in the synthesizing filter 43 in the encoder unit in FIG. 9.

An encoding/decoding method for transmitting a prediction error signal in accordance with a predictive coding scheme will be described hereinafter. The following various predictive coding schemes can be proposed by changing predictive functions for providing corresponding prediction signals.

First, in intraframe predictive coding, a value of a predictive function is given by a signal within a current frame. As shown in FIG. 11A, a predictive function value for a signal x representing coordinates (X0,Y0) is determined by an immediately preceding signal a representing coordinates (X0−1,Y0). According to this scheme, when x is included in a flat portion, i.e., a portion which has a moderate level change, a is very similar to x, so that the prediction error signal representing the difference therebetween is almost zero, thereby obtaining high coding efficiency. However, when x is derived from an edge between the image and the background, i.e, a portion which has an abrupt level change, a is greatly different from x. In this case, a prediction error signal has a larger value, and coding efficiency is low.

Second, in interframe predictive coding, a value of a predictive function is given by a signal of an immediately preceding frame. As shown in FIG. 11B, a predictive function value for a signal x representing coordinates (X0,Y0) is determined by a signal b representing identical coordinates of the immediately preceding frame. According to this scheme, when a level change is small, b is very similar to x, and thus a prediction error signal is almost zero. As a result high coding efficiency can be obtained. However, when a level change is abrupt, b is greatly different from x, and a prediction error signal has a large value. As a result, coding efficiency is low. In order to implement an encoder of this scheme, a frame memory is required.

Third, in motion compensated interframe predictive coding, a predictive function value is determined by a signal of the immediately preceding frame which represents a motion vector deviation. For example, as shown in FIG. 11C, a predictive function value of a signal x representing coordinates (X0,Y0) is determined by a signal c representing coordinates (X0−Vx,Y0−Vy) of the immediately preceding frame if a motion vector $\vec{V}=(Vx,Vy)$ is given. The motion vector $\vec{V}$ is a displacement of one-frame image near a portion representing the signal x and has a length and a direction in accordance with the position of the signal x. According to this scheme, if motion vectors can be calculated with high precision, c is very similar to x, and thus a prediction error signal thereof is a value near zero. As a result, coding efficiency can be improved. In addition, coding can be performed by using ½ to ⅓ the number of interframe predictive coding data. However, a frame memory and a motion vector detector are required to implement a practical motion compensated predictive encoder.

Even if one of the above coding schemes is used, a prediction error signal of the image signal is calculated in units of sampling pulses in a conventional encoder. The number of prediction error signals is the same as that of the image signals and is very large. For example, when an image signal of 30 frame/sec. is sampled at a sampling frequency of 10 MHz, about 330,000 prediction error signals must be produced. Even if effective coding is performed, a very large number of prediction error signals results in a very large number of encoded signals. As a result, a high compression ratio cannot be obtained.

An intraframe predictive coding scheme for the pulse sequence obtained by coding an image signal to multipulses will be described hereinafter.

A flat portion, i.e., a moderate level change portion of the image signal often has pulses having similar amplitudes.

When intraframe predictive coding for the pulse sequence is performed for such a flat portion of the image signal, the prediction error signals have small values. The number of pulses of the pulse sequence is greatly decreased as compared with that of sampled values. The number of data can be greatly decreased as compared with a case wherein the image signal is coded by intraframe predictive coding without processing.

More particularly, the following technique can be proposed. A two-dimensional pulse sequence is scanned and converted to one-dimensional signals. A current pulse x is predicted by using the immediately preceding pulse a as a prediction signal. The differences between the amplitudes and the positions of the signals x and a are coded, and the coded signals are transmitted. It should be noted that the position and amplitude of the first pulses must be transmitted.

The number of pulses used for prediction need not be one as described above. When a plurality of pulses are used to predict the amplitude and position of the next pulse, prediction can be performed with higher efficiency. In this case, the pulses used for prediction are not limited to ones on an identical scanning line but can be extended to those on different lines.

Figure 12:
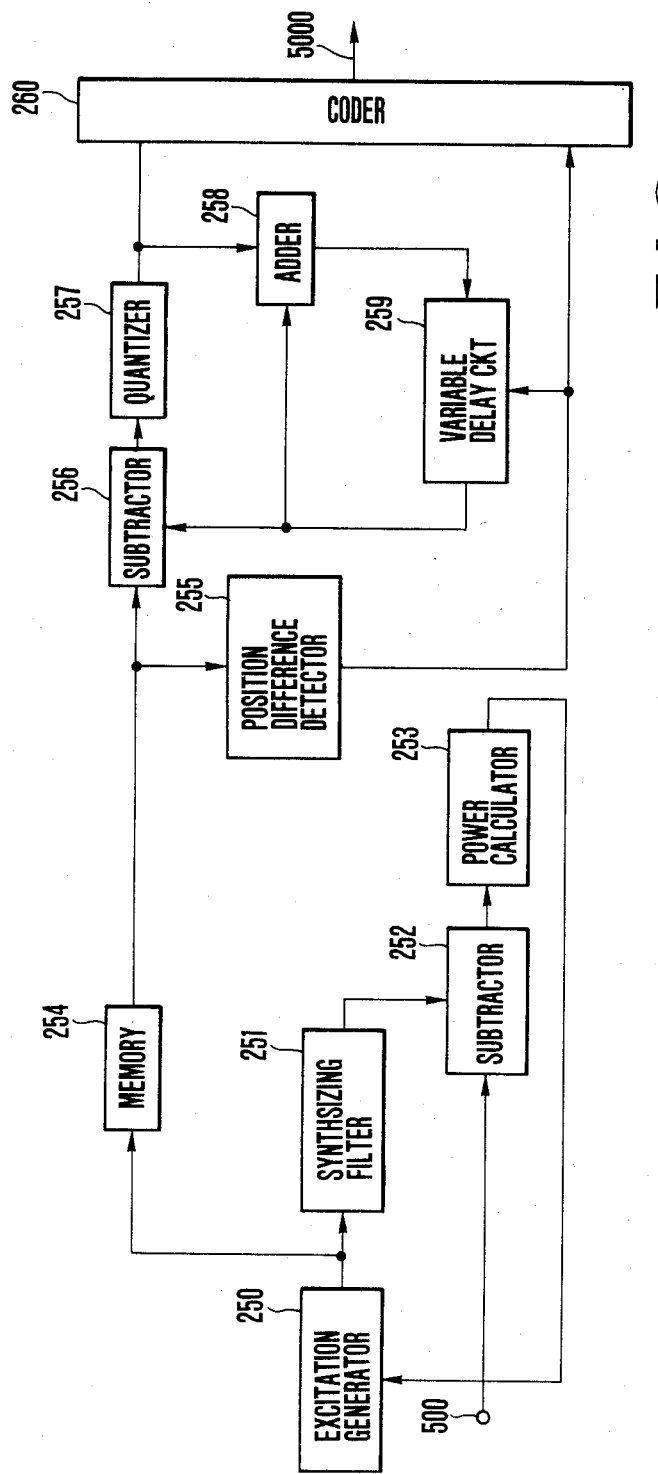
FIGS. 12 and 13 are block diagrams of encoder and decoder units for performing image signal predictive coding by using an intraframe predictive scheme according to still other embodiments of the present invention.
Figure 13:
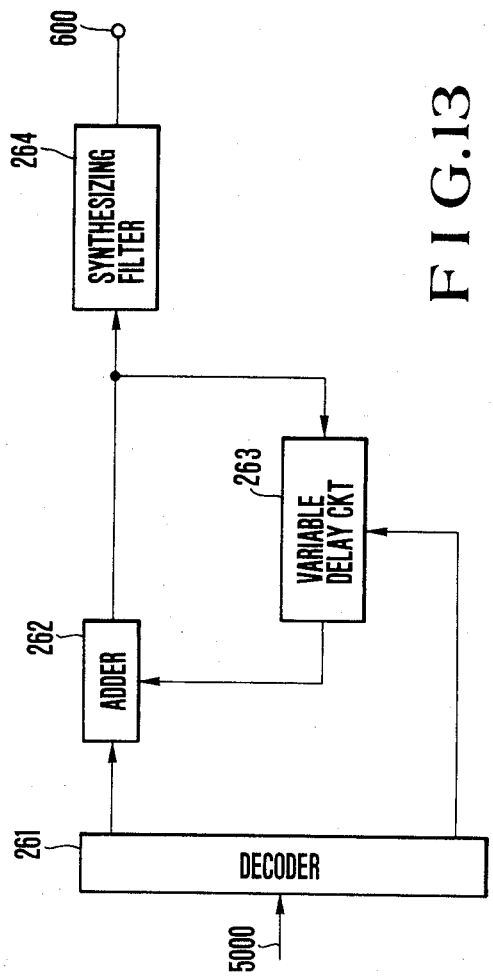

FIGS. 12 and 13 show still another embodiment of intraframe predictive encoder and decoder units. For the sake of simplicity, only the difference between amplitudes of the current pulse x and the immediately preceding pulse a among the prediction error signals is called a prediction error signal. The difference between positions of the current pulse x and the immediately preceding pulse a is called a position difference value.

In an intraframe predictive encoder unit of FIG. 12, a pulse generated by an excitation generator 250 is supplied to a synthesizing filter 251. A signal synthesized by the synthesizing filter 251 is subtracted by a subtractor 252 from an image signal supplied to an input terminal 500. A difference signal from the subtractor 252 is supplied to a power calculator 253. The power calculator 253 calculates an error power representing the difference between the television signal and the synthesized signal.

The position and amplitude of the pulse are varied by the excitation generator 250 to determine one pulse representing a minimum error power. The obtained pulse is left unchanged, and the next pulse is determined in the same manner as in the first pulse. By repeating the above operation, a signal similar to the television signal can be synthesized and is generated as a pulse sequence. The pulse sequence is supplied to a memory 254.

The pulse sequence supplied to the memory 254 is then supplied to a position difference detector 255 and a subtractor 256. The position difference detector 255 detects a position difference between the current pulse and the immediately preceding pulse by utilizing the pulse string supplied from the memory 254. The position difference value is supplied to a variable delay circuit 259 and a coder 260. The subtractor 256 calculates the difference between the current pulse of the pulse sequence supplied from the memory 254 and the prediction signal (i.e., the immediately preceding pulse) supplied from the variable delay circuit 259. The difference, i.e., the prediction error signal is supplied to a quantizer 257 with a function for limiting the number of levels of the prediction error signal. A prediction error signal quantized by the quantizer 257 is supplied to the coder 260 and an adder 258. The adder 258 generates a local decoded signal based on the prediction signal from the variable delay circuit 259 and the quantized prediction error signal. The local decoded signal is supplied to the delay circuit 259. The delay circuit 259 generates a prediction signal using the position difference signal detected by the position difference detector 255. The prediction signal is supplied to the subtractor 256 and the adder 258.

The coder 260 compresses the quantized prediction error signal from the quantizer 257 and the position difference signal supplied from the position difference detector 255. The compressed signals are sent onto the transmission line 5000.

In the intraframe predictive decoder unit in FIG. 13, the compressed signal supplied through the transmission line 5000 is supplied to a decoder 261. The decoder 261 stretches the compressed prediction error signal and the position difference value. The stretched prediction error signal is supplied to an adder 262, and the stretched position difference value is supplied to a variable delay circuit 263. The adder 262 predicts and decodes the current pulse by using the prediction error signal from the decoder 261, and the prediction signal (i.e., the immediately preceding pulse) supplied from the variable delay circuit 263. The decoded predictive pulse sequence is supplied to a synthesizing filter 264. The signals are synthesized by the synthesizing filter 264, so that an image signal appears at an output terminal 600.

Figure 15:
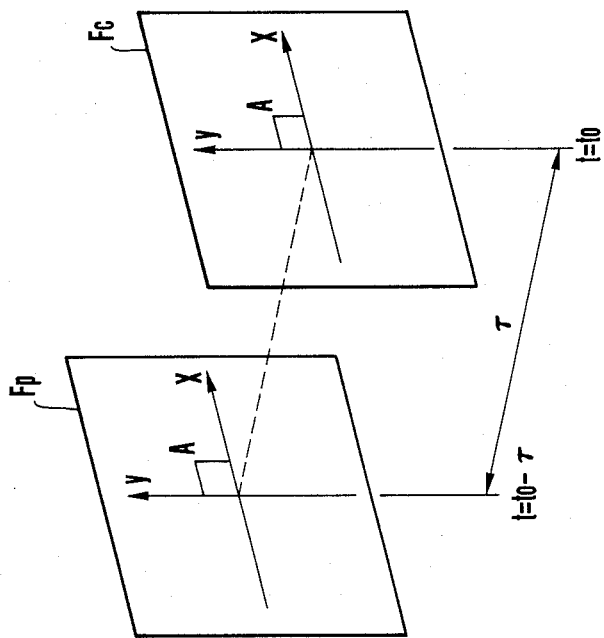
FIGS. 14 and 15 are diagrams for explaining a method of predictive coding of an image signal by using an interframe predictive scheme.
Figure 14:
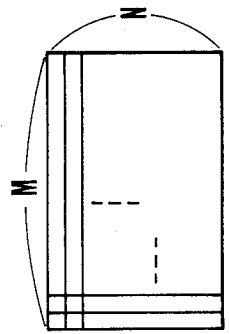
Figure 16:
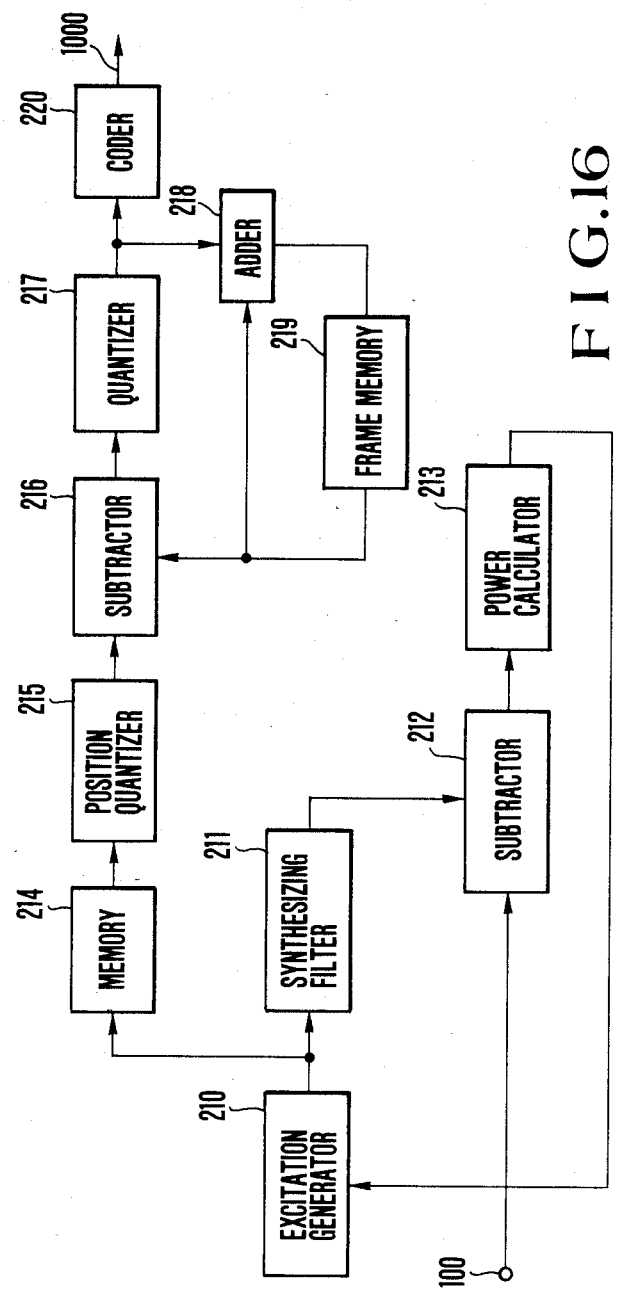
FIGS. 16 and 17 are respectively block diagrams of encoder and decoder units corresponding to the method in FIGS. 14 and 15 according to still other embodiments of the present invention.
Figure 17:
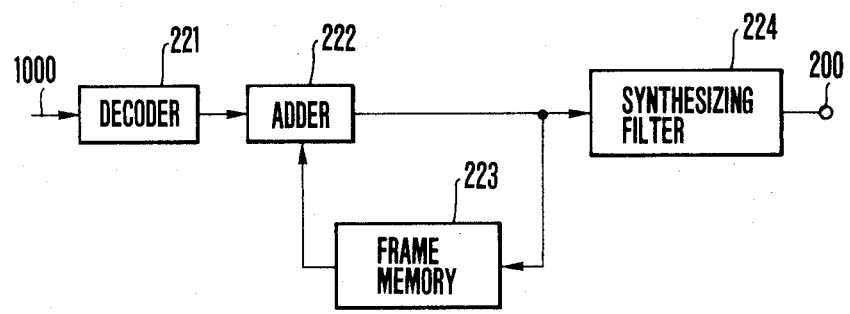

An interframe predictive coding scheme will be described with reference to still other embodiments. FIGS. 14 and 15 are diagrams for explaining the interframe predictive coding scheme, and FIGS. 16 and 17 show interframe predictive encoder and decoder units utilizing the scheme of FIGS. 14 and 15.

A pulse of the current frame probably rises at a similar amplitude to that of the immediately preceding frame in a television signal portion subjected to small motion.

For this reason, pulse position quantization is performed for a television signal portion representing small motion, and interframe predictive coding of the pulse sequence is performed. The values of the predication error signals probably have small values.

The number of pulses of the obtained pulse sequences is smaller than that of the sampled television signals. As compared with the case wherein the television signal is interframe predictive coded without modifications, a substantial decrease in the number of data can be expected when the interframe predictive coding is performed for the pulse sequence.

More specifically, the following technique is utilized. When interframe predictive coding of the pulse sequence obtained by multipulse encoding of the television signal is performed, a noncoincidence between the pulse position of the current frame and that of the immediately preceding frame causes a large prediction error signal.

In order to prevent this, the position data is quantized in the following manner. As shown in FIG. 14, one-frame image is divided into M×N blocks each of which does not include three or more pulses. A sum $$\sum_{i=1}^{n1} a_{1i}$$

of the amplitudes of the pulses contained in a block A of a current frame Fc is calculated to determine a pulse which is located at the central position of the block A of the current block Fc and which has an amplitude $$\sum_{i=1}^{n1} a_{1i}$$

Assume that n1 pulses are included in the block A in the current frame Fc. It should be noted denotes a one-frame time in the drawings from FIG. 15.

A pulse having a sum $$\sum_{i=1}^{n2} a_{2i}$$

of the amplitudes of all pulses included in a block A at the same position in the immediately preceding pulse Fp is set. Assume that n2 pulses are included in the block A of the immediately preceding frame Fp.

The pulse located at the central position in the block A of the immediately preceding frame Fp is used as a prediction signal for the pulse located at the central position in the block A of the current frame Fc, and a prediction error signal $$\sum_{i=1}^{n1} a1i - \sum_{i=1}^{n2} a2i$$

is coded and transmitted. The above operation is repeated for all M×N blocks of the current frame Fc.

According to this scheme, the sum $$\sum_{i=1}^{n1} a1i$$

of the amplitudes of the pulses included in all blocks in the first frame must be transmitted. Interframe coding is performed for the second and subsequent frames.

In the encoder unit in FIG. 16, a signal similar to the television signal and obtained in the same manner as in the intraframe predictive coder unit can be synthesized, and the resultant pulse sequence is supplied to a memory 214. The position of the pulse sequence supplied from the memory 214 is quantized by a position quantizer 215. The quantized position pulse sequence is supplied to a subtractor 216. The subtractor 216 calculates the difference between the pulse sequence supplied from the position quantizer 215 and the prediction signal of the immediately preceding frame which is supplied from a frame memory 219. The difference, i.e., the prediction error signal is supplied to a quantizer 217 with a function for limiting the number of possible levels of the prediction error signal. The prediction error signal quantized by the quantizer 217 is supplied to a coder 220 and an adder 218. The adder 218 adds the prediction signal supplied from the frame memory 219 and the quantized prediction error signal and supplies a local decoded signal to the frame memory 219. The local decoded signal is delayed by a one-frame period, and a delayed signal is used for generating the prediction signal. An output from the frame memory 219 is supplied to the subtractor 216 and the adder 218. The coder 220 compresses the quantized prediction error signal from the quantizer 217. The compressed signal is sent onto a transmission line 1000.

In a decoder unit in FIG. 17, the compressed encoded signal from the transmission line 1000 is supplied to a decoder 221. The decoder 221 stretches the compressed prediction error signal. The stretched signal is supplied to an adder 222. The adder 222 predicts and decodes the pulse sequence by using the prediction error signal supplied from the decoder 221 and the prediction signal of the immediately preceding frame from a frame memory 223. The decoded predictive pulse sequence is supplied to a synthesizing filter 224. The synthesizing filter 224 synthesizes a television signal which appears at an output terminal 200.

Figure 18:
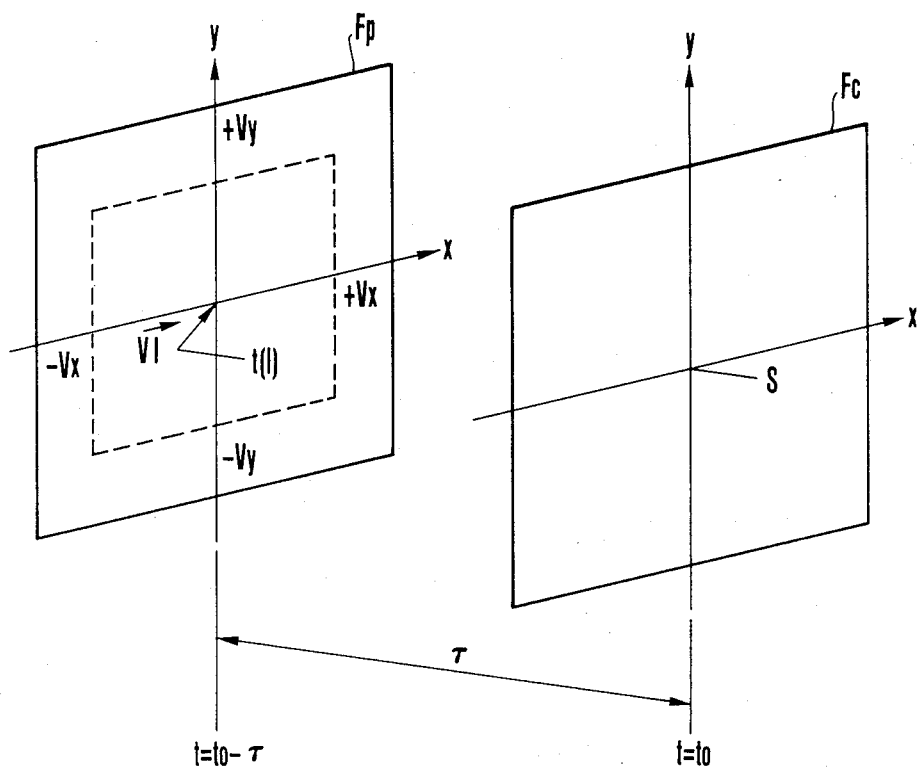
FIGS. 18, 19 and 20 are diagrams for explaining a method of predictive coding an image signal by using a motion compensated interframe predictive coding scheme.
Figure 19:
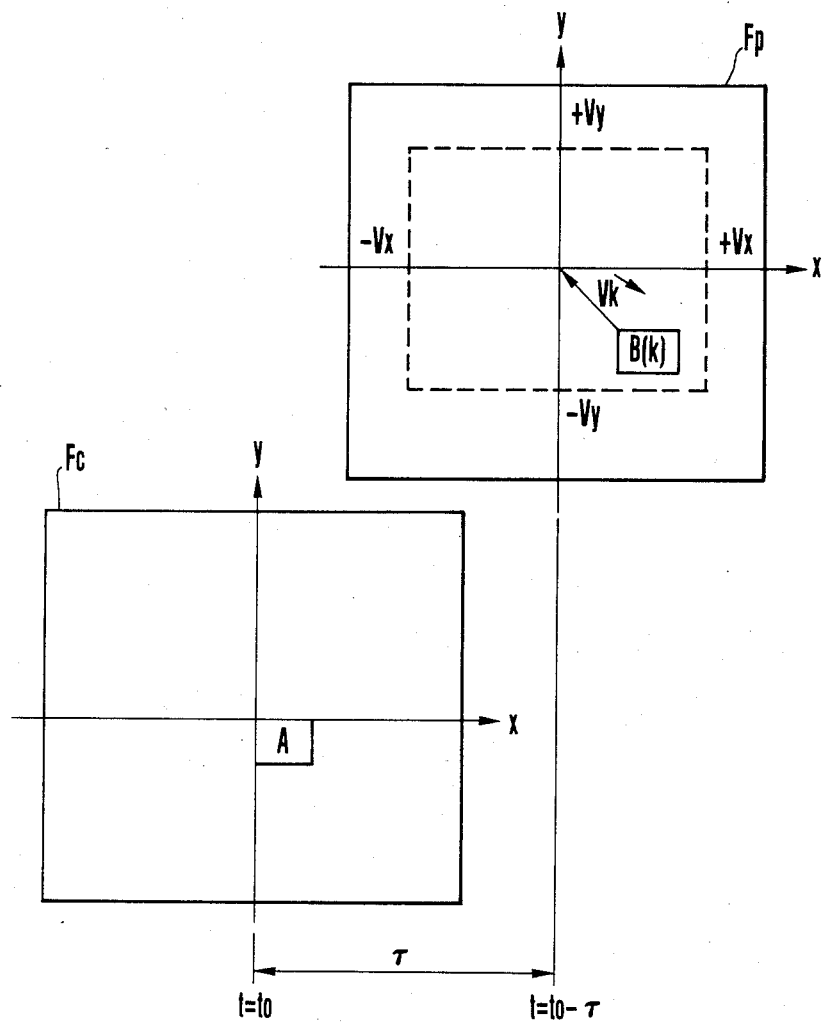
Figure 20:
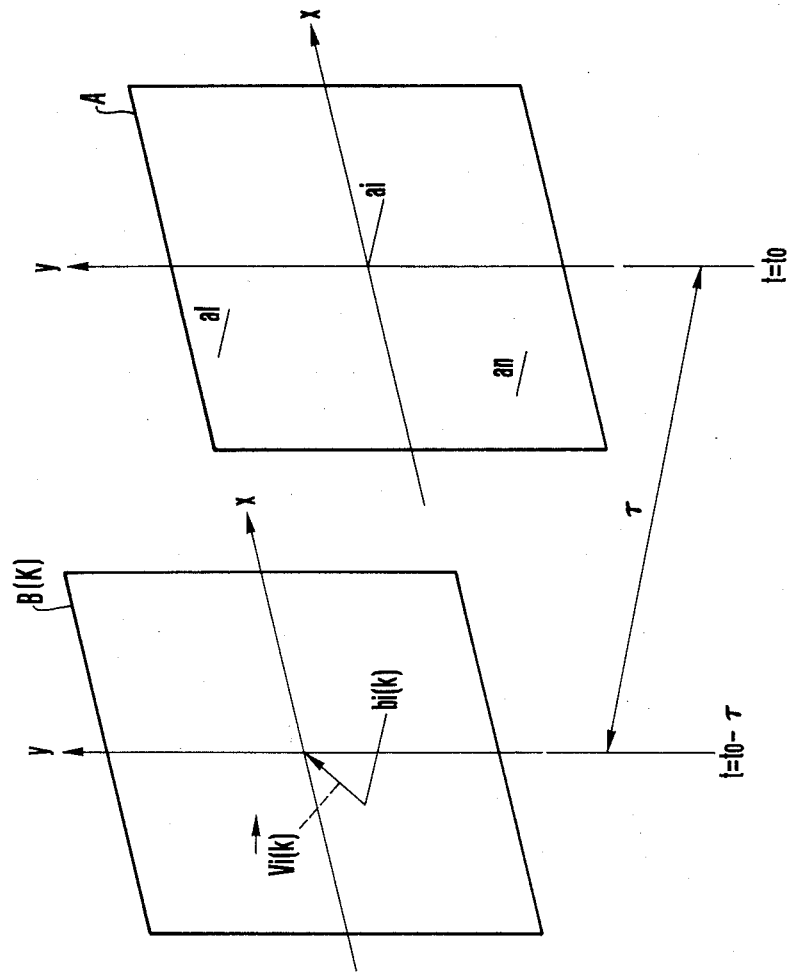
Figure 22:
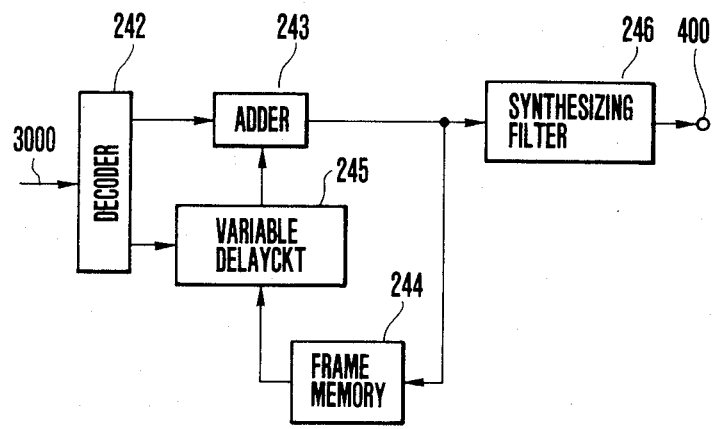

Still other embodiments of motion compensated interframe predictive coding for a pulse sequence obtained by performing multipulse coding of a television signal will be described hereinafter. FIGS. 18, 19 and 20 are representations for explaining motion compensated interframe predictive coding in this case. FIGS. 21 and 22 show motion compensated interframe predictive encoder and decoder units for practicing the technique shown in FIGS. 18 to 20.

A current frame pulse rises with an amplitude similar to that of the immediately preceding frame pulse when a television signal portion represents less motion. The current frame pulse probably rises with an amplitude similar to that of the immediately preceding frame pulse but at a position shifted therefrom. Therefore, the motion of the pulse sequence is detected and an immediately preceding frame pulse with an amplitude similar to that of the current frame pulse is found and used as a prediction signal, thereby minimizing the prediction error signal in interframe predictive coding.

Furthermore, the number of pulses in the pulse sequence obtained by performing multipulse coding of the television signal is greatly smaller than the number of sampled television signals. As compared with the case wherein the television signal is directly coded by motion compensated interframe predictive coding, the motion compensated interframe coding is performed for the pulse sequence. In this case, the number of data is expected to decrease greatly. It should be noted that a technique for detecting the motion of the pulse sequence in motion compensated interframe predictive coding can be a technique for detecting the motion in units of pulses or in units of blocks each including a plurality of pulses.

A still another embodiment of the present invention will be described wherein the motion of the pulse sequence is detected in units of pulses, and then motion compensated interframe predictive coding is performed.

As shown in FIG. 18, an evaluation function $D(s, t(l), \vec{v}l)$ representing a degree of matching between a pulse s of a current pulse Fc and a pulse t(l) of the immediately preceding frame Fp spaced by a motion vector vl from the current pulse s is determined.

The evaluation function $D(s, t(l), \vec{v}l)$ is exemplified by:

$$D(s, t(l), \vec{v}l) = (s - t(l))^2 + |\vec{v}l|^2$$

A smaller function is selected when the difference (s-t(l)) between the pulse s of the current frame Fc and the pulse t(l) of the immediately preceding frame Fp is small and the absolute value of the motion vector $\vec{v}l$ is small.

The evaluation functions $D(s, t(l), \vec{v}l)$ of different motion vectors $\vec{v}l$ within the motion compensation range (i.e., the region surrounded by the broken line in FIG. 18) are compared. The motion vector $\vec{v}l$ for providing the minimum $D(s, t(l), \vec{v}l)$ serves as a motion vector $\vec{V}op$ for given optimal predictive efficiency. A pulse t(op) of the immediately preceding frame which is spaced by the motion vector $\vec{V}op$ from the current pulse is used as a prediction signal of the pulse s of the current frame. The following three different prediction error signals are transmitted: the first prediction error signal represents a difference s − t(op) of the differences between the pulse s of the current frame and the pulse t(op) of the immediately preceding frame; the second one is the motion vector $\vec{V}op$; and third one is a number a of the pulse t(op) of the immediately preceding frame.

The number a of the pulse t(op) is given to the pulses of each frame in a given order.

The above operation is repeated for all pulses within the current frame. The amplitudes and positions of all pulses included in the first frame are transmitted. Three signals, i.e., the amplitude difference s −t(op), the motion vector $\vec{V}$op, and the predictive number a of the pulse t(op) of the immediately preceding frame which serves as the prediction signal of the current frame, are transmitted for the second and subsequent frames. Therefore, the amplitudes and positions of the pulses of all frames are determined.

In the following description of the encoder and decoder units, two types of signals are called as motion vector data. The first signal is the motion vector $\vec{V}$op, and the second signal is the number q of the pulse t(op) of the immediately preceding frame which serves as the prediction signal of the pulse s of the current frame. For the sake of simplicity, only the difference s−t(op) between the amplitudes of the pulses s of the current frame and the pulse t(op) of the immediately preceding frame is called a prediction error signal.

A case will be described wherein the motion is divided in units of blocks each including a plurality of pulses, and motion compensated interframe predictive coding is performed. As shown in FIG. 14, the current frame is divided into M×N blocks. Subsequently, as in FIG. 19, an evaluation function C(k) representing a degree of matching between the block A of the current frame Fc and the block B(k) of the immediately preceding frame Fp which is spaced apart by a trial vector $\vec{V}$k from the block A is given as follows.

In order to conveniently check the degree matching, the block A is overlayed the block B(k). As shown in FIG. 20, for a pulse ai (i=1, 2, ... n) (n pulses are included in the block A) in the block of the current frame, the nearest pulse bi(k) (i=1, 2, ... n) in the block B(k) of the frame is selected. An evaluation function Co(ai,bi(k),$\vec{v}$i(k)) (i=1, 2, ... n) is calculated in accordance with the amplitude of the pulse ai, the amplitude of the pulse bi(k) and the motion vector $\vec{V}$i(k) of the pulse ai obtained from the pulse bi(k). The evaluation function Co(ai,bi(k),$\vec{v}$i(k)) is exemplified by:

$$Co(ai,bi(k),\vec{v}i(k)) = [\{ai-bik)\}^2 + |vi(k)|^2]$$

A small evaluation function must be selected when a difference ai−bi(k) between the amplitudes of the pulses ai and bi(k) is small and the absolute value of the motion vector $\vec{v}$i(k) between the pulses is small. Evaluation functions Co(ai,bi(k),$\vec{v}$i(k)) (i=1, 2, ... n) of all pulses in the block A are calculated, and their sum:

$$C(k) = \sum_{i=1}^{n} Co(ai, bi(k), \vec{vi(k)})$$

is defined as an evaluation function representing the degree of matching between the blocks. The evaluation functions C(k) are compared for different vectors $\vec{V}$k within the motion compensation range (the region surrounded by the broken line in FIG. 19). The vector $\vec{V}$k for providing the minimum C(k) is given as a motion vector $\vec{V}$opt for the optimal predictive efficiency. A prediction signal for the pulse ai in the block A in the current frame is selected from the pulses in the blocks B(opt) of the immediately preceding frame which is away from the block A by the motion vector $\vec{V}$opt. In other words, a pulse bi(opt) in the block B(opt) nearest the pulse ai when the blocks A and B(opt) overlap is selected. It should be noted that the pulses within an identical frame have a predetermined order. A number Pi is assigned to the pulse bi(opt) of the immediately preceding frame. In this case, the position of the pulse ai corresponding to the pulse bi(opt) is represented by the motion vector $\vec{v}$i(opt). The four types data for the block A must be sent as prediction error signals: the first one is a difference ai−bi between the amplitudes of the pulse ai of the current frame and the pulse bi(opt) of the immediately preceding pulse bi(opt); the second one is the motion vector $\vec{v}$i(opt) between the pulses; the third one is the motion vector Vopt between the blocks; and fourth one is the number Pi of the pulse bi(opt) of the immediately preceding frame which serves as the prediction signal of the pulse ai of the current frame. The differences ai−bi(opt), the motion vectors $\vec{v}$i(opt) and the pulse numbers Pi are transmitted for the number corresponding to the number of pulses included in the blocks.

The above operation is repeated for the M×N blocks of the current frame. It should be noted that the amplitudes and positions of all pulses in the first frame are transmitted. The four types of signals as the prediction error signals, i.e., the amplitude difference ai−bi(opt), the motion vector $\vec{v}$i(opt), the motion vector $\vec{V}$opt and the number Pi of the pulse bi(opt) of the immediately preceding frame are transmitted for the second and subsequent frames. The amplitudes and the positions of the pulses in all frames are determined.

In the following description of encoder and decoder units to be described in detail later, three types of signals among the prediction error signals are called as motion vector data: the motion vector $\vec{v}$i(opt) between the pulses, the motion vector $\vec{V}$opt between the blocks, and the number Pi of the pulse bi(opt) of the immediately preceding frame. For the sake of simplicity, only the amplitude difference ai−bi(opt) between the pulse ai of the current frame and the pulse bi(opt) of the immediately preceding frame is called a prediction error signal.

In an encoder unit in FIG. 21, a pulse generated by an excitation generator 230 is supplied to a synthesizing filter 231. A signal synthesized by the synthesizing filter 231 is supplied to a subtractor 232. The subtractor 232 calculates the difference between the synthesized signal and a television signal supplied to an input terminal 300. A difference signal from the subtractor 232 is supplied to a power calculator 233. The power calculator 233 calculates an error power representing the difference between the television signal and the synthesized signal. The position and amplitude of the pulse is varied by the excitation generator 230 to determine one pulse for minimizing the error power. The determined pulse is left unchanged, and the next pulse is determined in accordance with the same operation as described above. By repeating this operation, a pulse sequence for synthesizing a signal similar to the television signal can be obtained by the synthesizing filter. The pulse sequence is supplied to a memory 234. The pulse sequence is supplied to a vector detector 235 and a subtractor 236. The vector detector 235 detects motion of the pulse by using the pulse sequence and the pulse sequence of the immediately preceding frame which is supplied from a frame memory 239. The motion vector signal detected by the vector detector 235 is supplied to a variable delay circuit 240 and a coder 241. The subtractor 236 calculates the difference between the pulse sequence supplied from the memory 234 and the motion compensated prediction signal of the immediately preceding frame which is supplied from the variable delay circuit 240. The difference, i.e., the prediction error signal is supplied to a quantizer 237 with a function for limiting the number of possible levels of the prediction error signal. A prediction error signal quantized by the quantizer 237 is supplied to the coder 241 and an adder 238. The adder 238 generates a local decoded signal in accordance with the prediction signal supplied from the variable delay circuit 240 and the quantized prediction error signal. The local decoded signal is supplied to the frame memory 239 and delayed by a one-frame time. The delayed signal is then used for vector detection and prediction signal generation. An output from the frame memory 239 is supplied to the vector detector 235 and the variable delay circuit 240.

The variable delay circuit 240 generates a motion compensated prediction signal which is generated by the vector detector 235 and which is detected by using motion vector data. The motion compensated prediction signal is supplied to the subtractor 236 and the adder 238.

The coder 241 compresses the motion vector data from the vector detector 235 and the quantized prediction error signal from the quantizer 237. The compressed signal is sent onto a transmission line 3000.

In a decoder unit shown in FIG. 22, the compressed signal from the transmission line 3000 is supplied to a decoder 242. The decoder 242 stretches the compressed prediction error signal and the compressed motion vector data. The decoded prediction error signal is supplied to an adder 243, and the decoded motion vector data is supplied to a variable delay circuit 245. The prediction error signal is added by an adder 243 to the prediction signal from the variable delay circuit 245, thereby predicting and decoding the pulse sequence. The predicted and decoded pulse sequence is supplied to a synthesizing filter 246 and a frame memory 244. The synthesizing filter 246 synthesizes the television signal and supplies a synthesized signal on an output terminal 400. The predicted and decoded pulse sequence read out from the frame memory is supplied to the variable delay circuit 245 for generating the prediction signal. The variable delay circuit 245 generates a prediction signal in accordance with the motion vector data supplied from the decoder 242.

Intraframe predictive coding, interframe predictive coding and motion compensated interframe coding for the pulse sequences obtained by performing multiple pulse coding of television signals have been described. These coding schemes may be combined.

For example, a scheme for regularly or adaptively switching predictive coding for every frame, or a scheme for adaptively switching predictive coding for every block may be utilized. Either scheme may be used without preference.

Figure 23A:
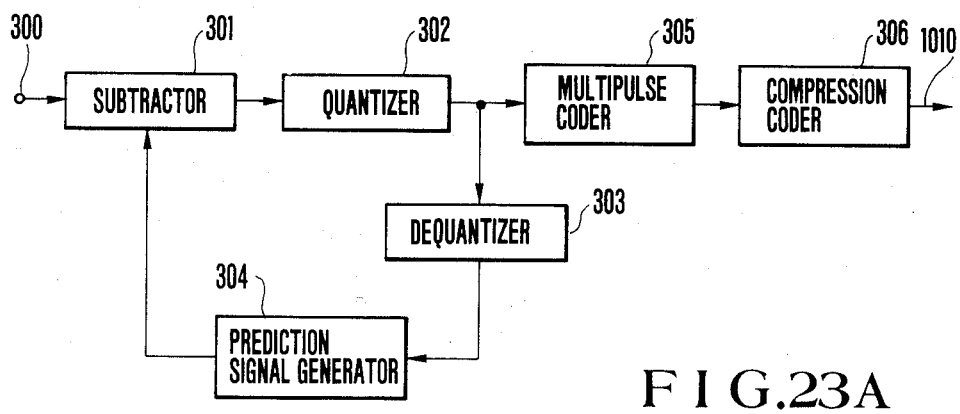
FIGS. 23A and 23B are respectively block diagrams of encoder and decoder units each with a quantizer in a predictive coding loop.
Figure 23B:
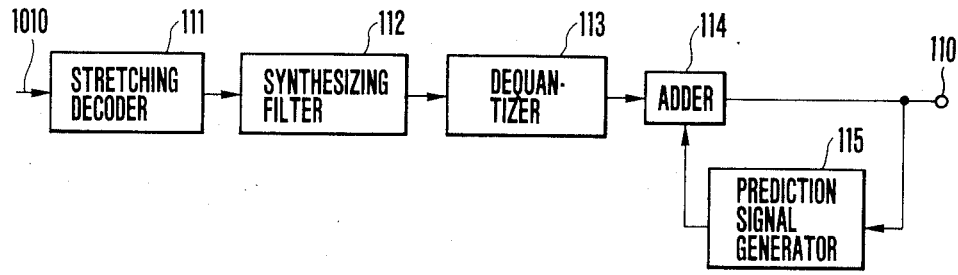

FIGS. 23A and 23B show encoder and decoder units each of which has a prediction error signal quantizer in a predictive encoding loop.

In an encoder unit in FIG. 23A, an image signal supplied to an input terminal 300 is supplied to a subtractor 301. The subtractor 301 calculates the difference between the image signal and a prediction signal supplied from a prediction signal generator 304. The difference, i.e., a prediction error signal is supplied to and quantized by a quantizer 302. Quantization techniques include linear quantization and nonlinear quantization. When linear quantization is adapted, the lower bits of the prediction error are omitted from an output at the quantizer, so that a total number of bits of the prediction error signal is decreased. When nonlinear quantization is adapted, the number of bits of a prediction error signal is decreased in accordance with nonlinear quantization characteristics. A quantized prediction error signal is supplied to a dequantizer 303 and a multipulse coder 305. The dequantizer 303 dequantizes the quantized prediction error signal. Dequantization techniques include linear dequantization and nonlinear dequantization. When linear dequantization is adapted, "0" bits numbering the same omitted bits are added to the LSB of the prediction error signal, and dequantization is performed by the dequantizer 303. Even if nonlinear dequantization is adapted, the number of bits is returned to that prior to quantization in accordance with nonlinear dequantization characteristics. In the following description, the quantizer and the dequantizer are operated in the same manner. The dequantized prediction error signal is supplied to a prediction signal generator 304 and is used for generation of a prediction signal. A multipulse coder 305 performs multipulse coding of the quantized prediction error signal to derive a pulse sequence. The pulse sequence is supplied to and compressed by a compression coder 306. The compressed signal appears on a transmission line 1010.

In a decoder unit in FIG. 23B, the compressed and encoded signal from the transmission line 1010 is supplied to a stretching decoder 111. The stretching decoder 111 stretches the compressed pulse sequence, and the stretched output is supplied to a synthesizing filter 112. The synthesizing filter 112 synthesizes a prediction error signal which is then supplied to a dequantizer 113. The dequantizer 113 dequantizes the quantized prediction error signal. Dequantizer techniques include linear dequantization and nonlinear dequantization. When linear dequantization is selected, "0" bits numbering the same as bits omitted by the sending quantizer are added to the LSB of the prediction error signal quantized by the dequantizer 113, thereby restoring the number of bits prior to quantization at the sensing side. When nonlinear dequantization is adapted, the number of bits prior to quantization is obtained in accordance with nonlinear dequantization characteristics. A dequantizer in the following embodiment is operated in the same manner as described above. The dequantized prediction error signal is supplied to an adder 114. An image signal is predicted and decoded by the adder 114 in accordance with the prediction error signal dequantized by the dequantizer 113 and the prediction signal supplied from the prediction signal generator 115. The predicted and decoded image signal is supplied to an output terminal 110 and a prediction signal generator 115. The predicted and decoded image signal read out from the prediction signal generator 115 is supplied as a prediction signal to the adder 114.

FIGS. 24 and 25 show intraframe predictive encoder and decoder units which exemplify the embodiments of FIGS. 23A and 23B according to still other embodiments of the present invention.

Referring to FIG. 24, an image signal supplied to an input terminal 100 is supplied to a subtractor 310. The subtractor 310 calculates the difference between the image signal supplied from the input terminal 100 and the prediction signal from a delay circuit 313. The difference, i.e., the prediction error signal is supplied to a quantizer 311 with a function for limiting the number of possible levels of the prediction signal. The prediction error signal quantized by the quantizer 311 is supplied to a subtractor 316 and a dequantizer 309. The quantized prediction error signal is dequantized by the dequantizer 309. The dequantized signal is supplied to an adder 312. The adder 312 generates a local decoded signal in accordance with the prediction signal supplied from a delay circuit 313 and the dequantized prediction error signal. The local decoded signal is supplied to the delay circuit 313 and delayed by a one-pixel time. The delayed signal is used for generation of the prediction signal. An output from the delay circuit 313 is supplied to a subtractor 310 and an adder 312.

A pulse generated by an excitation generator 314 is supplied to a synthesizing filter 315. The signal synthesized by the synthesizing filter 315 is supplied to a subtractor 316. The subtractor 316 calculates the difference between the synthesized signal from the synthesizing filter 315 and the quantized prediction error signal supplied from the quantizer 311. The difference is supplied to a power calculator 317. The power calculator 317 calculates an error power representing the difference between the quantized prediction error signal and the synthesized signal.

The excitation generator 314 changes the position and amplitude of the pulse and determines one pulse for minimizing the error power. The determined pulse is left unchanged, and the next pulse is determined in the same manner as described above. By repeating the above operation, a pulse sequence for synthesizing a signal similar to the quantized prediction error signal is generated by the synthesizing filter 315 and supplied to a memory 318. The signal is supplied to a compression coder 319, and a compressed and coded signal appears on a transmission line 1000.

A decoder unit in FIG. 25 is the same as that of FIG. 23B, except that the prediction signal generator 115 in FIG. 23B is replaced with a delay circuit 116 to generate a prediction signal, and a detailed description thereof will be omitted.

FIGS. 26 and 27 show interframe predictive encoder and decoder units which exemplify the embodiments of FIGS. 23A and 23B according to still other embodiments of the present invention.

The encoder unit in FIG. 26 can be achieved by replacing the delay circuit in FIG. 24 with a frame memory 320. The operation of the encoder unit in FIG. 26 is substantially the same as that in FIG. 24, and a detailed description thereof will be omitted.

The decoder unit in FIG. 27 can be achieved by replacing the delay circuit 116 in the decoder unit in FIG. 25 with a frame memory 117. The operation of the decoder unit in FIG. 27 is the same as that in FIG. 25, and a detailed description thereof will be omitted.

Figures 28, 29:
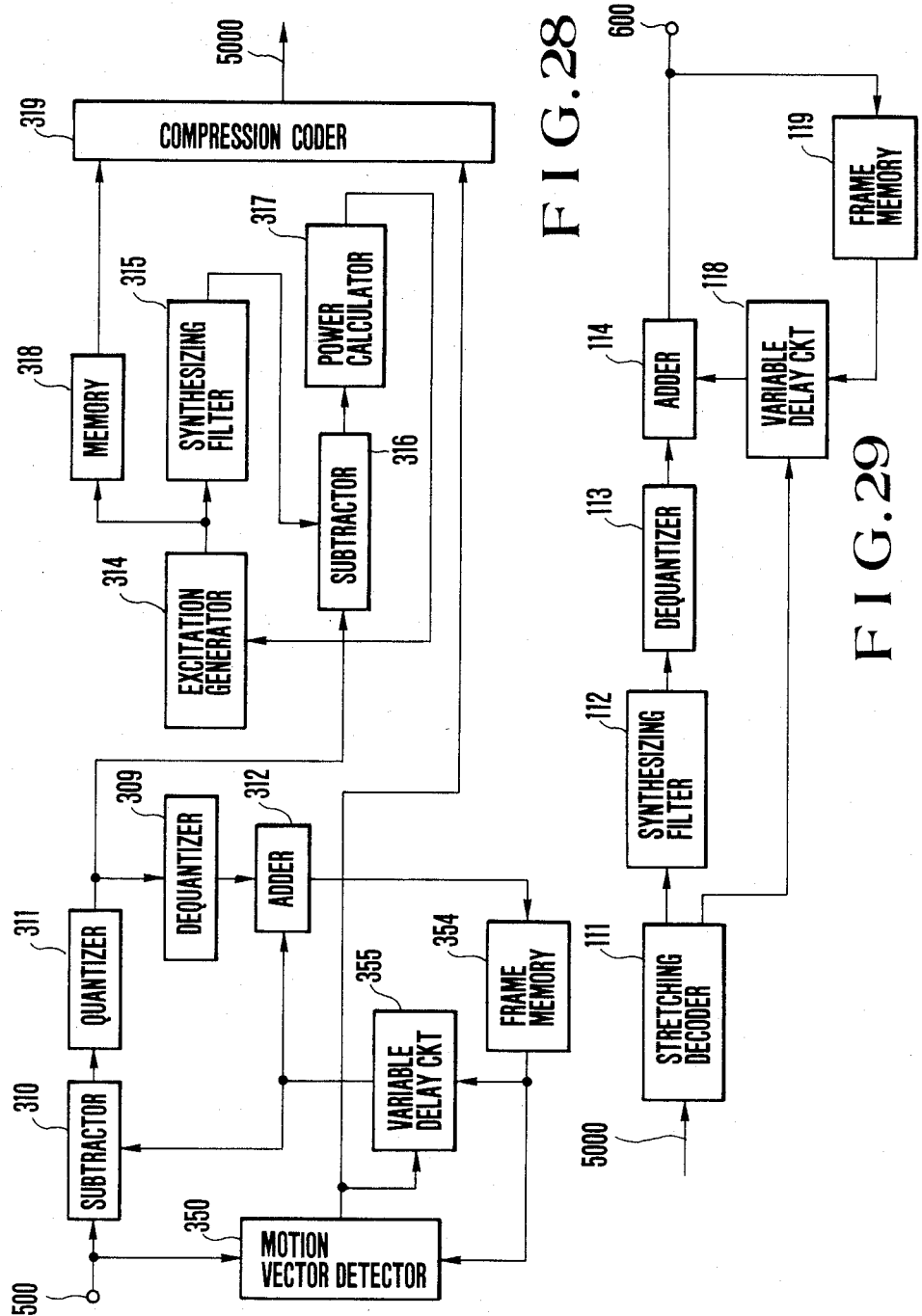
FIGS. 28 and 29 are respectively block diagrams of encoder and decoder units which exemplify the embodiments of FIGS. 23A and 23B in accordance with a motion compensated interframe predictive scheme.

FIGS. 28 and 29 show motion compensated interframe predictive encoder and decoder units which exemplify the embodiments of FIGS. 23A and 23B.

In an encoder unit in FIG. 28, an image signal supplied to an input terminal 500 is supplied to a motion vector detector 350 and a subtractor 310. The motion vector detector 350 detects picture motion by using the image signal and an image signal of the immediately preceding frame which is supplied from a frame memory 354. The motion vector detected by the motion vector detector 350 is supplied to a variable delay circuit 355 and a compression coder 319. The subtractor 310 calculates the difference between the image signal supplied from the input terminal 500 and the motion compensated prediction signal of the immediately preceding frame. The difference, i.e., the prediction error signal is supplied to a quantizer 311 with a function for limiting the number of possible levels of the prediction error signal. The prediction error signal quantized by the quantizer 311 is supplied to a subtractor 316 and a dequantizer 309. The dequantizer 309 dequantizes the quantized prediction error signal. The dequantized signal is supplied to an adder 312. The adder 312 generates a local decoded signal in accordance with a prediction signal supplied from the variable delay circuit 355 and the quantized prediction error signal. The local decoded signal is supplied to the frame memory 354 and is delayed by a one-frame time. The delayed signal is used for motion vector detection and the prediction signal generation. An output from the frame memory 354 is supplied to the motion vector detector 350 and the variable delay circuit 355. The variable delay circuit 355 generates a motion compensated prediction signal by using the motion vector supplied from the motion vector detector 350. The output from the variable delay circuit 355 is supplied to a subtractor 310 and an adder 312. The arrangement and operation of an excitation generator 314, a synthesizing filter 315, a subtractor 316, a power calculator 317, a memory 318, and a compression coder 319 are the same as those of the embodiment in FIG. 24, and a detailed description thereof will be omitted.

In a decoder unit in FIG. 29, the compressed and encoded signal supplied from the transmission line 5000 is supplied to a stretching decoder 111. The stretching decoder 111 stretches the compressed motion vector and the compressed pulse sequence. The stretched and decoded pulse sequence is supplied to a synthesizing filter 112, and the stretched and decoded motion vector is supplied to a variable delay circuit 118. The synthesizing filter 112 synthesizes a quantized prediction error signal which is then supplied to a dequantizer 113. The dequantizer 113 dequantizes the quantized prediction error signal. The dequantized signal is supplied to an adder 114. The dequantized prediction error signal is added by the adder 114 to the prediction signal from the variable delay circuit 118, so that the image signal can be predicted and decoded. This image signal is supplied to an output terminal 600 and a frame memory 119. The predicted and decoded image signal read out from the frame memory 119 is supplied to the variable delay circuit 118 for generating the prediction signal. The variable delay circuit 118 generates the prediction signal in accordance with the motion vector supplied from the stretching decoder 111. The prediction signal is supplied to the adder 114.

FIGS. 30A and 30B show encoder and decoder units without including a quantizer in a predictive coding loop to exemplify as special cases of the embodiments of FIGS. 23A and 23B.

In an encoder unit in FIG. 30A, an image signal supplied to an input terminal 420 is supplied to a prediction signal generator 421 and a subtractor 422. The prediction signal generator 421 generates a prediction signal in accordance with the image signal supplied to the input terminal 420. The prediction signal is supplied to the subtractor 422. The subtractor 422 calculates the difference between the image signal supplied to the input terminal 420 and the prediction signal supplied from the prediction signal generator 421. The difference, i.e., the prediction error signal is supplied to a multipulse encoder 423. The multipulse encoder 423 performs multipulse encoding of the prediction error signal to obtain a pulse sequence. The pulse sequence is supplied to a compression coder 424 and is compressed and coded.

The compressed pulse sequence is finally sent onto a transmission line 1020.

In a decoder unit in FIG. 30B, the compressed and coded signal supplied from the transmission line 1020 is supplied to a stretching decoder 121. The stretching decoder 121 stretches and decodes the compressed and coded pulse sequence. The stretched and decoded pulse sequence is supplied to a synthesizing filter 122. The synthesizing filter 122 synthesizes a prediction error signal which is then supplied to an adder 123. The adder 123 predicts and decodes the image signal in accordance with the prediction error signal supplied from the synthesizing filter 122 and the prediction signal supplied from the prediction signal generator 124. The predicted and decoded image signal is supplied to an output terminal 120 and the prediction signal generator 124. The predicted and decoded image signal read out from the prediction signal generator 124 is supplied as a prediction signal to the adder 123.

Figure 31:
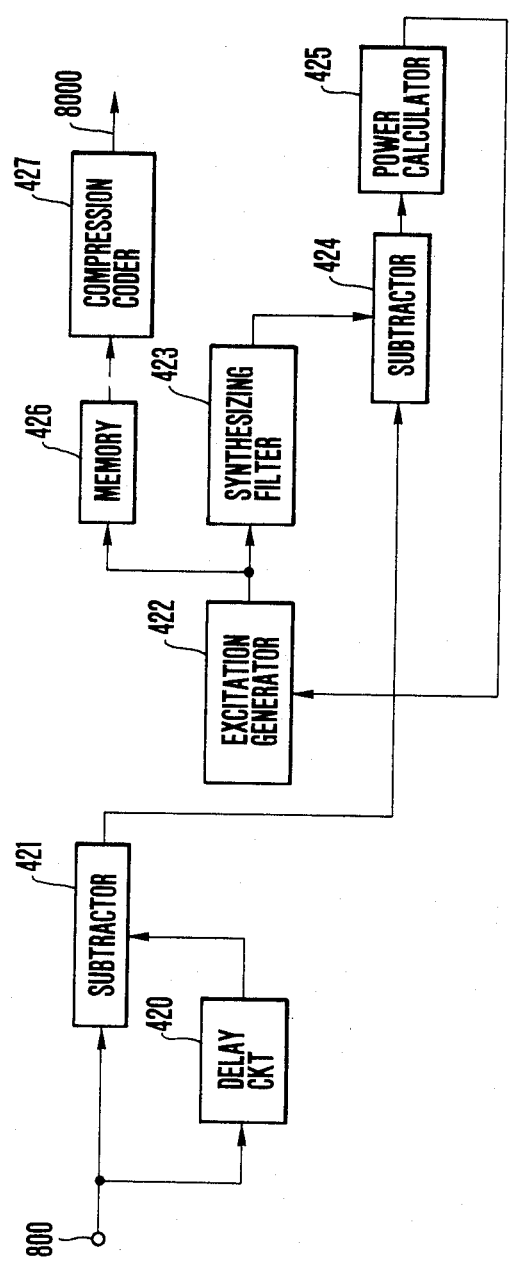
FIG. 31 is a block diagram of an encoder unit which exemplifies the embodiment of FIG. 30A in accordance with an intraframe predictive scheme.

FIG. 31 shows an interframe predictive encoder which exemplifies the embodiment of FIG. 30A according to still another embodiment of the present invention. Referring to FIG. 31, an image signal supplied to an input terminal 800 is supplied to a delay circuit 420 and a subtractor 421. The delay circuit 420 delays the image signal from the terminal 420 by a one-pixel time, thereby generating a prediction signal. The prediction signal is supplied to the subtractor 421. The subtractor 421 calculates the difference between the image signal supplied to the input terminal 800 and the prediction signal from the delay circuit 420. The difference, i.e., the prediction error signal is supplied to a subtractor 424. The subsequent operation is the same as that of the encoder unit in FIG. 26, and a detailed description thereof will be omitted.

In order to implement an interframe predictive encoder unit, the delay circuit 420 in the encoder unit in FIG. 31 is replaced with a frame memory. Furthermore, in order to implement a motion compensated interframe predictive encoder unit, the delay circuit 420 in the encoder unit in FIG. 31 is replaced with a frame memory, and at the same time the motion vector detector 350 and the variable delay circuit 355 in FIG. 28 are added.

The predictive decoder unit corresponding to FIG. 30B performs intraframe predictive encoding, interframe predictive decoding or motion compensated predictive decoding so as to match with the corresponding encoder. The synthesizing filter may comprise a two- or one-dimensional filter so as to match with the corresponding encoder unit.

An encoder unit having a multipulse coder in an encoding loop of the image signal predictive coder according to still another embodiment of the present invention will be described with reference to FIG. 32.

Referring to FIG. 32, an image signal supplied to an input terminal 530 is supplied to a subtractor 531. The subtractor 531 calculates the difference between the image signal and a prediction signal supplied from a prediction signal generator 534. The difference, i.e., the prediction error signal is supplied to a multipulse coder 532. The prediction error signal is multipulse coded, and thus a pulse sequence is calculated. The pulse sequence is supplied to a synthesizing filter 533 and a compression coder 535. The synthesizing filter 533 synthesizes a prediction error signal by using the pulse sequence. The synthesized prediction error signal is supplied to a prediction signal generator 534 and is used for generating a prediction signal. The compression coder 535 compresses and codes the pulse signal, and the compressed and coded pulse sequence is sent onto a transmission line 1030.

FIG. 33 shows an encoder unit for performing intraframe prediction by utilizing the embodiment of FIG. 32 according to still another embodiment of the present invention. Referring to FIG. 33, an image signal supplied to an input terminal 540 is supplied to a subtractor 570. The subtractor 570 calculates the difference between the image signal supplied from the terminal 530 and a prediction signal supplied from a delay circuit 578. The difference, i.e., the prediction error signal is supplied to a subtractor 573.

A pulse generated by an excitation generator 571 is supplied to a synthesizing filter 572. A signal synthesized by the synthesizing filter 572 is supplied to a subtractor 570. The subtractor 570 calculates the difference between the synthesized signal and the prediction error signal supplied from the subtractor 570. The difference is supplied to a power calculator 574. The power calculator 574 calculates an error power representing the difference between the prediction error signal and the synthesized signal.

The excitation generator 571 changes pulse position and amplitude and determines one pulse for minimizing the error power.

The determined pulse is left unchanged, and the next pulse is obtained in the same manner as described above. A pulse sequence for synthesizing a signal similar to the prediction error signal can be generated by the synthesizing filter 572. The pulse sequence is then supplied to a memory 575. The pulse sequence supplied to the memory 575 is then supplied to a compression coder 579 and a synthesizing filter 576. The synthesizing filter 576 synthesizes the prediction error signal in accordance with the pulse sequence. This prediction error signal is then supplied to an adder 577. The adder 577 generates a local decoded signal in accordance with the prediction error signal supplied from the synthesizing filter 576 and the prediction signal supplied from the delay circuit 578. The local decoded signal is supplied to the delay circuit 578 and is delayed by a one-pixel time. The delayed signal is used for prediction signal generation. An output from the delay circuit 578 is supplied to a subtractor 570 and an adder 577. The pulse sequence supplied to the compression coder 589 is compressed and coded. The compressed and coded pulse sequence is sent onto a transmission line 7000.

When interframe predictive coding or motion compensated interframe predictive coding is used in the embodiment of FIG. 32, the same arrangement as described above can be utilized.

The units in FIGS. 30A, 30B and 32 have higher precision than that of the units in FIGS. 23A and 23B. It should be noted that the encoder units in FIGS. 30A and 32 differ in S/N ratio and frequency characteristics of output noise. More specifically, in the encoder/decoder unit of FIGS. 30A, 30B, the frequency characteristics of noise generated by multipulse coding are converted by the frequency characteristics of the synthesizing filter 122 for synthesizing the prediction error signal from the pulse sequence at the reception side, thereby decreasing the high-frequency component. Therefore, the encoder/decoder unit in FIGS. 30A, 30B is effective to decrease the high-frequency component.

In the encoder unit of FIG. 32, a high S/N ratio can be obtained, and the frequency characteristics of noise generated by multipulse coding are not converted by the receiving synthesizing filter and appear as the output.

In the encoder units of FIGS. 23A, 30A and 32, intraframe predictive coding, interframe predictive coding or motion compensated interframe coding can be performed. Multipulse coding can be performed by a technique for two-dimensionally producing a pulse sequence by a two-dimensional filter as a synthesizing filter, or a technique for one-dimensionally producing a pulse sequence by using a one-dimensional filter as a synthesizing filter. These techniques can be combined in accordance with the characteristics and purpose of the image signal. For example, the following techniques may be utilized: a technique for eliminating time-base correlation in accordance with interframe predictive coding or motion compensated interframe predictive coding and spatial correlation by two-dimensional multipulse coding; and a technique for eliminating horizontal correlation in accordance with intraframe predictive coding and vertical correlation in accordance with one-dimensional multipulse coding.

What is claimed is:

1. A method of encoding/decoding an image signal, wherein a pulse sequence for minimizing a difference between an input image signal and a synthesized signal obtained by supplying the pulse sequence to a transmitting synthesizing filter is calculated and coded, and the coded pulse sequence is transmitted at a transmission side; and the coded pulse sequence is decoded, the decoded pulse sequence is supplied to a receiving synthesizing filter to generate a synthesized signal, and the synthesized signal is generated as a decoded image signal corresponding to the input image signal at a receiving side.

2. A method according to claim 1, wherein the input image signal represents a two-dimensional image, and said synthesizing filter comprises a two-dimensional synthesizing filter.

3. A method according to claim 1, wherein the input image signal is obtained as a one-dimensional time-serial signal by scanning a two-dimensional image, and said synthesizing filter comprises a one-dimensional synthesizing filter.

4. A method according to claim 1, wherein a pulse sequence for minimizing a difference between an input image signal and a synthesized signal obtained by supplying the pulse sequence to a transmitting synthesizing filter is calculated, the pulse sequence is predictive coded, a prediction error signal of the predictive coded pulse sequence is compressed and coded, and the compressed and coded prediction error signal is transmitted at a transmission side; and the compressed and coded prediction error signal is stretched and decoded, the stretched and decoded prediction error signal is predictive decoded to a pulse sequence, and the predictive decoded pulse sequence is supplied to the receiving synthesizing filter to obtain the image signal.

5. A method according to claim 4, wherein the prediction error signal includes difference signals of amplitudes and positions of pulses in the pulse sequence and immediately preceding pulses.

6. A method according to claim 4, wherein the prediction error signal includes a difference signal representing a difference between a sum of amplitudes of all pulses included in each of blocks each of which does not include more than two pulses in a current frame and a sum of an immediately preceding frame.

7. A method according to claim 4, wherein the prediction error signal includes, within a motion compensation range, an amplitude of a current frame, a difference between amplitudes of a pulse of the current frame and a pulse of an immediately preceding frame which is separated from the pulse of the current frame by a motion vector for giving optimal prediction efficiency, the motion vector and a pulse number of the immediately preceding frame.

8. An apparatus for encoding/decoding an image signal, comprising: a transmitting synthesizing filter for receiving a pulse sequence; means for calculating a difference between a signal from said transmitting synthesizing filter and a given image signal; means for generating a pulse sequence for minimizing the difference; means for encoding the pulse sequence for minimizing the difference; means for receiving and decoding the encoded pulse sequence into a decoded pulse sequence; and means for supplying the decoded pulse sequence to a receiving synthesizing filter and generating a synthesized signal as a decoded image signal.

9. An apparatus according to claim 8, wherein the given image signal represents a two-dimensional image signal, and said synthesizing filter comprises a two-dimensional synthesizing filter.

10. An apparatus according to claim 8, including means for converting a two-dimensional image signal to a one-dimensional signal, and wherein said synthesizing filter is a one-dimensional synthesizing filter.

11. An apparatus according to claim 8, wherein said apparatus comprises means for quantizing a prediction error signal into a quantized prediction error signal as said given image signal; first dequantizing means for dequantizing the quantized prediction error signal into a first dequantized signal: means for generating a first prediction signal on the basis of said first dequantized signal; second difference calculating means for comparing the first prediction signal and an imput image signal to generate the prediction error signal; second dequatizing means for dequantizing the synthesized signal into a second dequantized signal; means for obtaining the decided image signal in accordance with a second prediction signal and said second dequatized signal; means for generating said second prediction signal on the basis of the decoded image signal.

12. An apparatus according to claim 8, wherein
    said encoding means includes means for predictive coding the pulse sequence and means for encoding and transmitting a prediction error signal from said predictive coding means after compression and coding; and
    said decoding means includes means for receiving, stretching and decoding a compressed and coded prediction error signal, and means for predicting and decoding the stretched and decoded prediction error signal to a pulse sequence which is supplied to said receiving sythesizing filter.

13. An apparatus according to claim 12, wherein
    said predictive coding means includes memory means for storing the pulse sequence, position difference detecting means for detecting a difference of positions represented by pulses from said memory means, variable delay means for generating the prediction signal, subtracting means for calculating a difference between outputs from said memory means and said variable delaying means and generating the difference as the prediction error signal; quantizing means for quantizing an output signal from said subtracting means and supplying a quantized signal to said compression coding means, and adding means for adding outputs from said quantizing means and said variable delaying means and supplying a local decoded signal to said variable delaying means; and said predictive decoding means includes variable delaying means operated in response to the position difference signal and adding means for adding the prediction error signal and an output from said variable delaying means thereof and supplies a sum as an input to said variable delaying means and to said synthesizing filter.

14. An apparatus according to claim 12, wherein said predictive coding means includes memory means for storing the pulse sequence, position quantizing means for quantizing a position of an output pulse from said memory means, frame memory means for generating the prediction signal, subtracting means for calculating a difference between outputs from said frame memory means and said position quantizing means and generating the difference as a prediction error signal, quantizing means for quantizing an output from said subtracting means and supplying a quantized signal to said compression coding means, and adding means for adding outputs from said frame memory means and said quantizing means and supplying a local decoded signal as an input to said frame memory means; and said predictive decoding means includes receiving frame memory means for storing a decoded signal of the immediately preceding frame, and adding means for adding outputs from said stretching decoding means and said receiving frame memory means and supplying a sum as an input to said receiving frame memory means and said synthesizing filter.

15. An apparatus according to claim 12, wherein said predictive coding means includes memory means for storing the pulse sequence, frame memory means for storing the pulses of the immediately preceding frame, motion vector detecting means for receiving outputs from said memory means and said frame memory means and detecting a motion vector which is supplied to said compression coding means, variable delaying means for receiving outputs from said frame memory means and said motion vector detecting means and generating the prediction signal, subtracting means for calculating a difference between outputs from said memory means and said variable delaying means and generating the difference as the prediction error signal, quantizing means for quantizing an output from said subtracting means and supplying a quantized signal to said compression coding means, and adding means for adding outputs from said variable delaying means and said quantizing means and supplying a local decoded signal as an input to said frame memory means; and said predictive decoding means includes receiving variable delaying means for generating the prediction signal in response to the motion vector signal, receiving adding means for adding the stretched and decoded prediction error signal and the output from said receiving variable delaying means and supplying a sum to said synthesizing filter, and receiving frame memory means for storing the sum from said receiving adding means and supplying the sum to said receiving variable delaying means.

* * * * *